(12) United States Patent
Corsmeier

(10) Patent No.: US 10,737,444 B2
(45) Date of Patent: Aug. 11, 2020

(54) METHODS AND ASSEMBLIES FOR FORMING FEATURES IN COMPOSITE COMPONENTS

(71) Applicant: General Electric Company, Schenectady, NY (US)

(72) Inventor: Donald Michael Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 510 days.

(21) Appl. No.: 15/481,643

(22) Filed: Apr. 7, 2017

(65) Prior Publication Data
US 2018/0290391 A1    Oct. 11, 2018

(51) Int. Cl.
*B29C 67/24* (2006.01)
*B29C 70/46* (2006.01)
(Continued)

(52) U.S. Cl.
CPC .............. *B29C 66/70* (2013.01); *B29C 66/72* (2013.01); *B29C 70/345* (2013.01);
(Continued)

(58) Field of Classification Search
CPC ......... B29C 70/00; B29C 70/28; B29C 70/40; B29C 70/42; B29C 70/46; B29C 70/462;
(Continued)

(56) References Cited

U.S. PATENT DOCUMENTS

| 1,541,119 A | 6/1925 | DeRusha |
| 1,790,178 A | 1/1931 | Sutherland, Jr. |

(Continued)

FOREIGN PATENT DOCUMENTS

| CA | 2942015 A1 | 3/2017 |
| DE | 102010015199 A1 | 10/2011 |

(Continued)

OTHER PUBLICATIONS

Non-Final Office Action Corresponding to U.S. Appl. No. 15/481,592 dated Apr. 22, 2019.
(Continued)

*Primary Examiner* — Philip C Tucker
*Assistant Examiner* — Brian R Slawski
(74) *Attorney, Agent, or Firm* — Dority & Manning, P.A.

(57) ABSTRACT

Various methods and assemblies are provided for producing composite components having formed in features. For example, a method may comprise depositing a composite material on a base tool; aligning an aperture forming tool with a tooling aperture in the base tool; inserting the aperture forming tool through the composite material to form an aperture in the composite material; deploying a feature forming tool to press the composite material into one or more recesses; and processing the composite material with the feature forming tool in contact with the composite material. In some embodiments, the feature forming tool includes a stem extending through the composite material and into the base tool, as well as a feature forming head that is brought into contact with and processed with the composite material. In other embodiments, a tooling assembly holds a pin in place during processing to fix the pin in the composite component.

17 Claims, 21 Drawing Sheets

(51) Int. Cl.

| | | |
|---|---|---|
| *B29C 70/48* | (2006.01) | |
| *B29C 70/54* | (2006.01) | |
| *B29C 65/00* | (2006.01) | |
| *B32B 37/00* | (2006.01) | |
| *B29C 70/34* | (2006.01) | |
| *F01D 25/24* | (2006.01) | |
| *B32B 5/26* | (2006.01) | |
| *B32B 18/00* | (2006.01) | |

(52) U.S. Cl.
CPC ............ *B29C 70/545* (2013.01); *F01D 25/24* (2013.01); *B29C 66/71* (2013.01); *B29C 66/712* (2013.01); *B29C 70/462* (2013.01); *B29C 70/48* (2013.01); *B29C 70/541* (2013.01); *B29C 70/543* (2013.01); *B29C 70/546* (2013.01); *B32B 5/26* (2013.01); *B32B 18/00* (2013.01)

(58) Field of Classification Search
CPC ....... B29C 70/467; B29C 70/48; B29C 70/54; B29C 70/541; B29C 70/542; B29C 70/543; B29C 70/545; B29C 70/546; B29C 70/548; B29C 70/345; B29C 65/48; B29C 65/483; B29C 67/24; B29C 67/721; Y10T 156/1002; Y10T 156/1056; Y10T 156/1057; Y10T 156/1304; B26F 1/24; B26F 1/14; B26F 1/02; B26F 2001/4427
USPC .......... 156/60, 89.11, 91, 92, 169, 173, 196, 156/212, 213, 221, 242, 245, 250, 252, 156/253, 307.1, 307.4; 264/299, 319, 264/320, 324, 330, 331.11, 154, 155, 156, 264/316, 241, 257, 258
See application file for complete search history.

(56) References Cited

U.S. PATENT DOCUMENTS

| | | |
|---|---|---|
| 2,467,969 A | 4/1949 | Debrot, Jr. |
| 2,682,083 A | 6/1954 | Patton |
| 2,691,199 A | 10/1954 | Schlueter |
| 3,661,668 A | 5/1972 | Wheeler |
| 3,787,546 A | 1/1974 | Pratt et al. |
| 4,236,365 A | 12/1980 | Wheeler |
| 4,248,820 A | 2/1981 | Haataja |
| 4,502,092 A | 2/1985 | Bannink, Jr. et al. |
| 4,946,640 A | 7/1990 | Nathoo |
| 5,151,277 A | 9/1992 | Bernardon et al. |
| 5,641,449 A | 6/1997 | Owens |
| 6,190,602 B1 | 2/2001 | Blaney et al. |
| 6,830,718 B2 | 12/2004 | Maumus et al. |
| 8,200,885 B2 | 6/2012 | Sartore |
| 2007/0176323 A1 | 8/2007 | Jones et al. |
| 2012/0261057 A1 | 10/2012 | Bergmann et al. |
| 2015/0152744 A1 | 6/2015 | LeBoulicaut |
| 2015/0165747 A1 | 6/2015 | Garcia Solares et al. |
| 2017/0009600 A1* | 1/2017 | Grasso .................... F01D 5/189 |
| 2017/0348876 A1 | 12/2017 | Lin et al. |

FOREIGN PATENT DOCUMENTS

| | | | |
|---|---|---|---|
| EP | 2492069 A1 | 8/2012 | |
| FR | 2820359 A1 * | 8/2002 | ............ B29C 70/46 |
| FR | 2820359 A1 | 8/2002 | |
| FR | 3033521 A1 | 9/2016 | |
| JP | 60011320 A * | 1/1985 | |
| JP | S6011320 | 1/1985 | |
| JP | 2003039455 A | 2/2003 | |
| JP | 2003103743 A | 4/2003 | |
| JP | 2005-330958 | 12/2005 | |
| WO | WO2007/101868 A2 | 9/2007 | |

OTHER PUBLICATIONS

Non-Final Office Action Corresponding to U.S. Appl. No. 15/481,611 dated Apr. 12, 2019.
Non-Final Office Action Corresponding to U.S. Appl. No. 15/481,643 dated Jun. 26, 2019.
Canadian Office Action Corresponding to CA Application No. 2999703 dated Mar. 21, 2019.
Canadian Office Action Corresponding to CA Application No. 2999743 dated Mar. 20, 2019.
European Patent Search Report Corresponding to EP Application No. 181654385 dated Sep. 4, 2018.
European Patent Search Report Corresponding to EP Application No. 181654419 dated Sep. 11, 2018.
European Patent Search Report Corresponding to EP Application No. 181654427 dated Sep. 5, 2018.
Japanese Office Action Corresponding to JP Application No. 2018-071986.
Japanese Office Action Corresponding to JP Application No. 2018-071983.

* cited by examiner

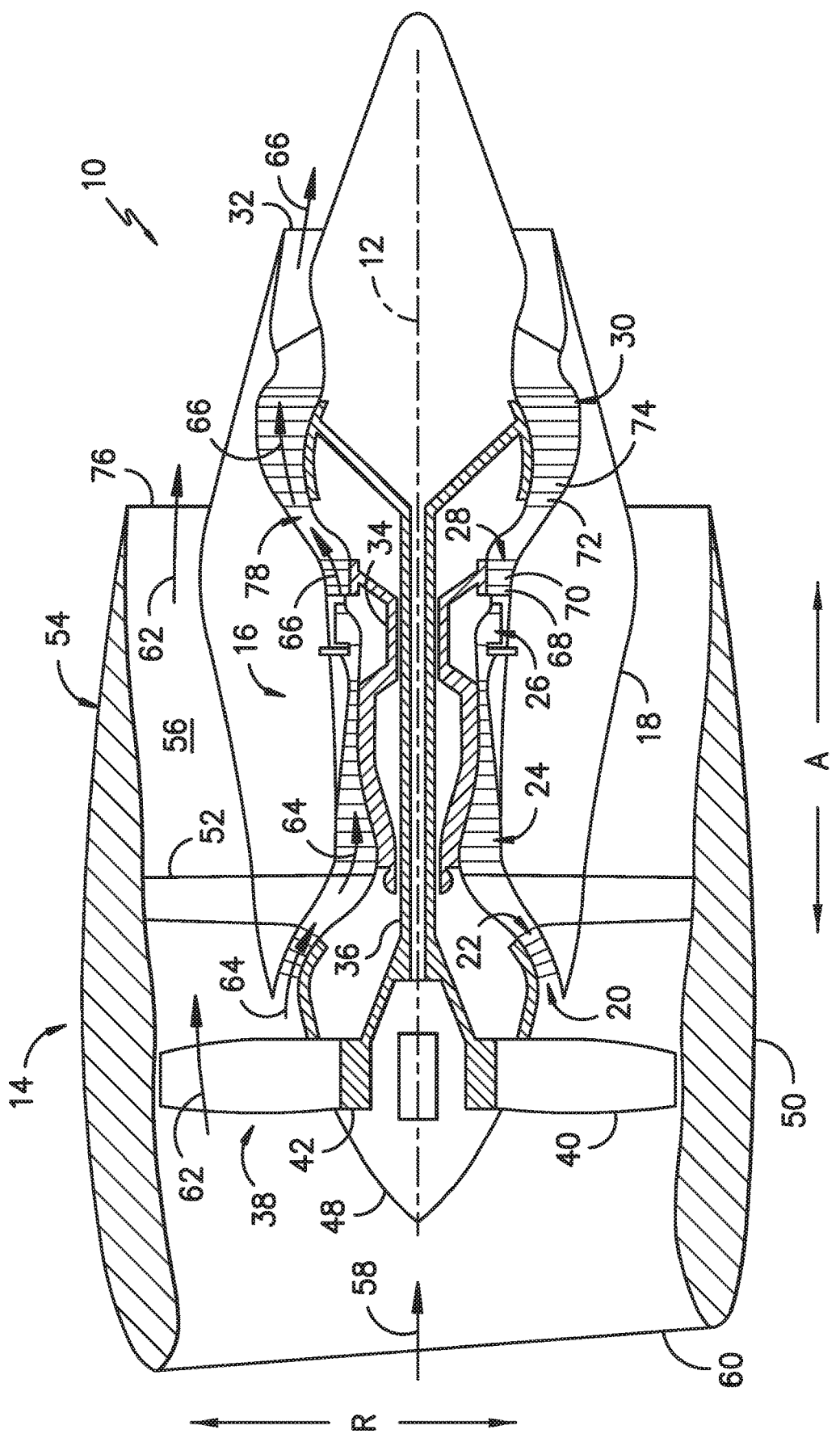
FIG. -1-

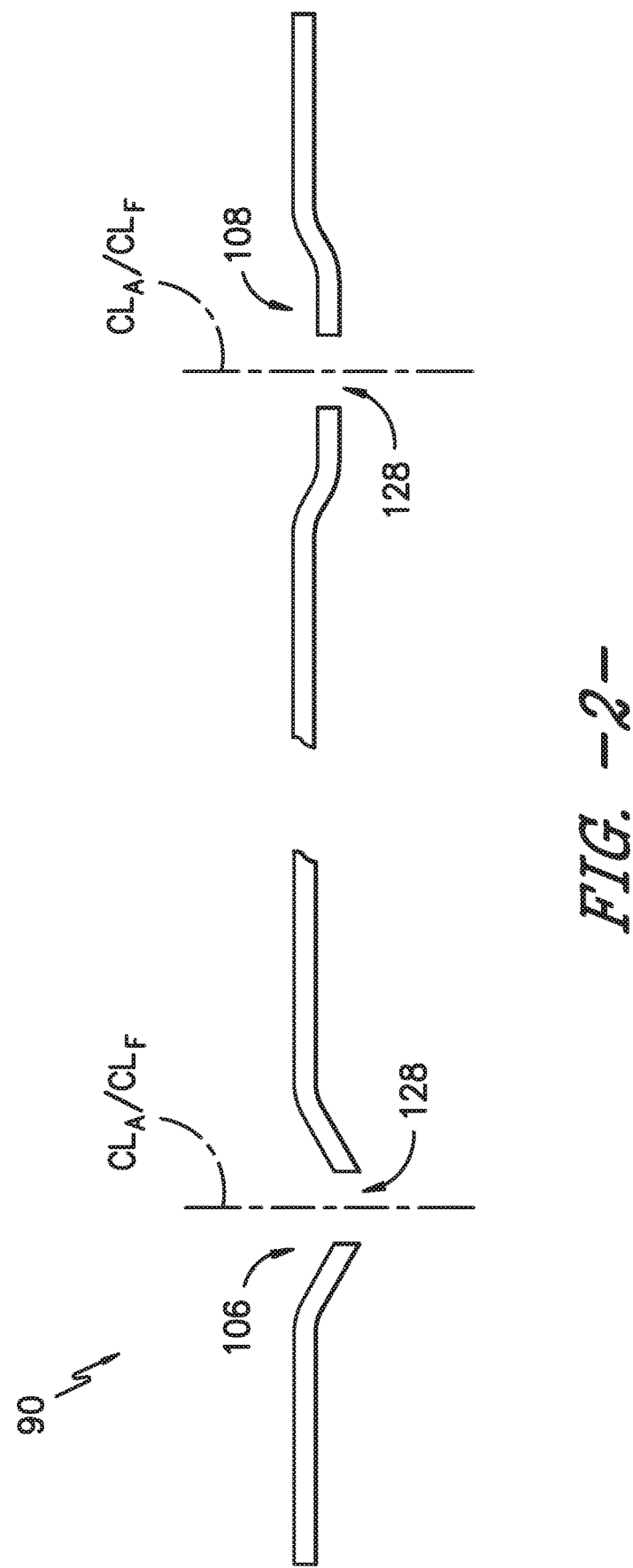
FIG. -2-

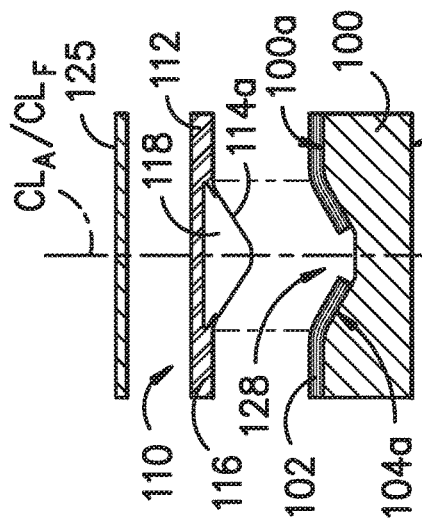
FIG. -3A-
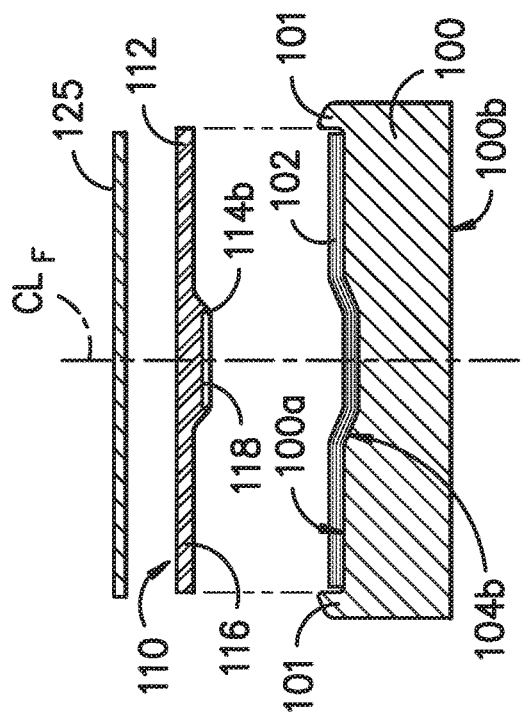
FIG. -3B-
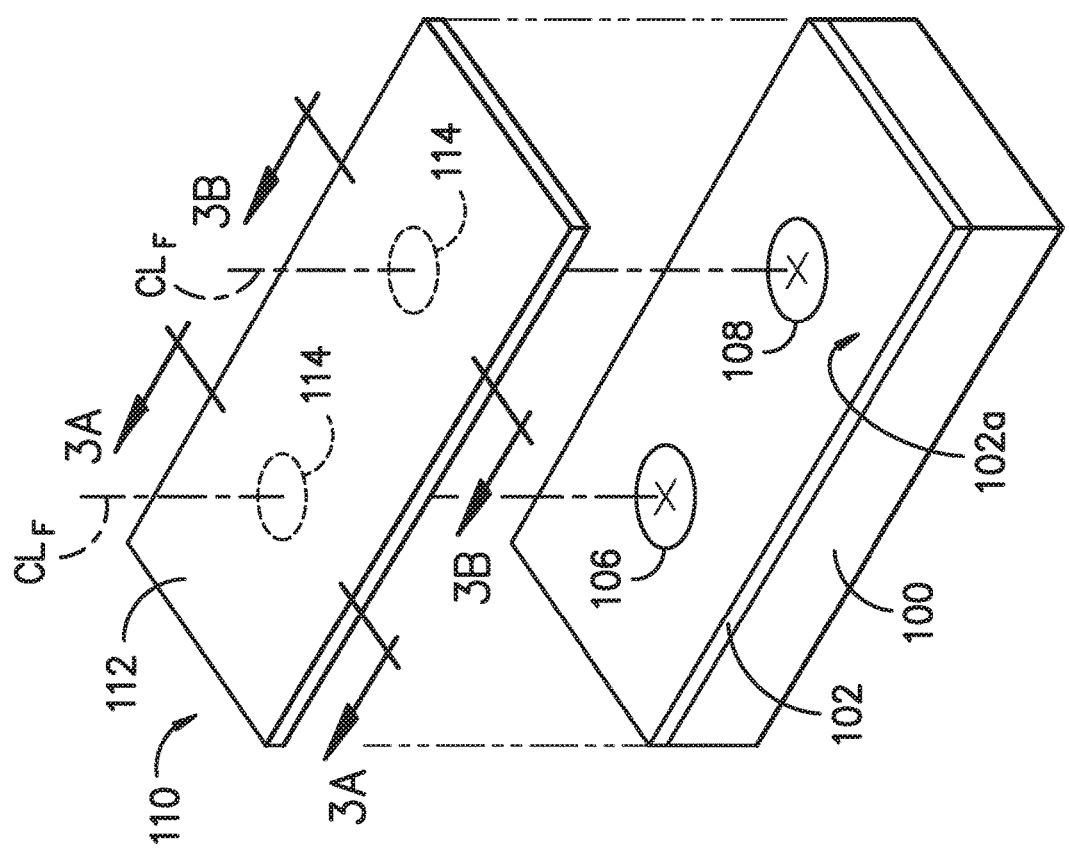
FIG. -3-

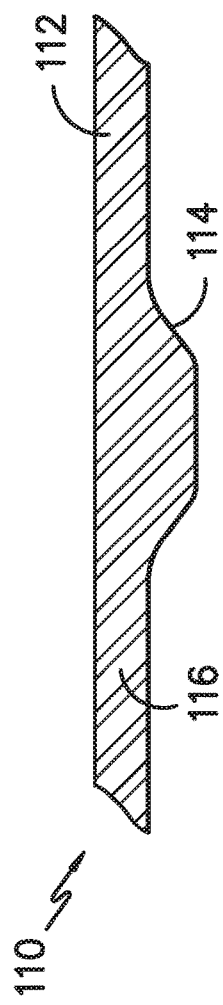
FIG. -4A-
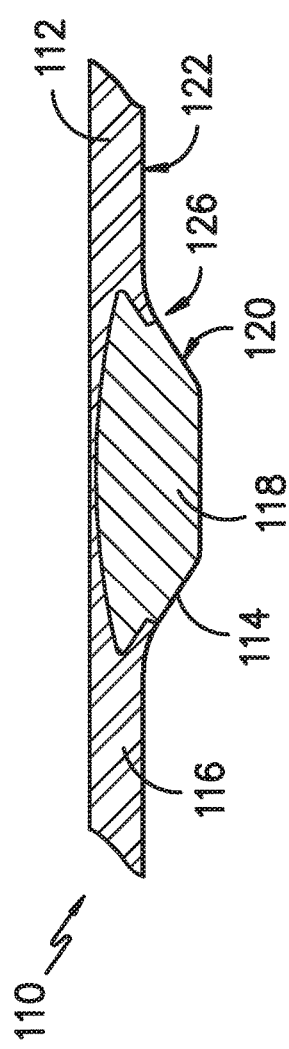
FIG. -4B-
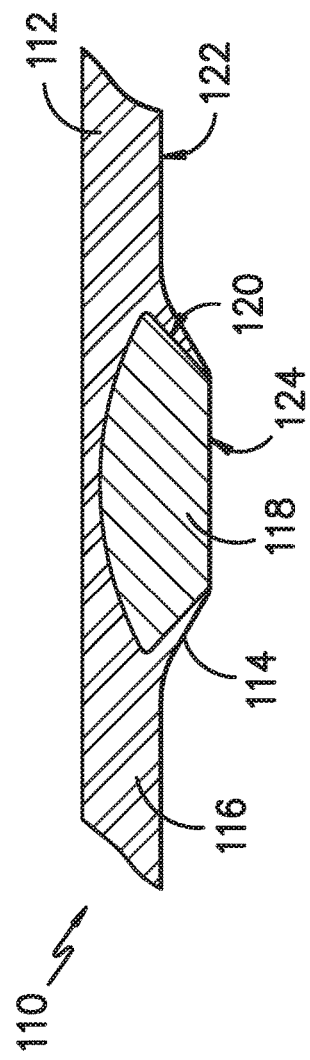
FIG. -4C-
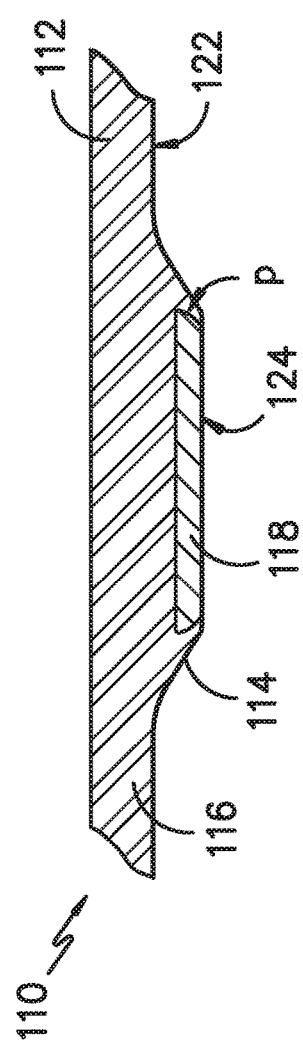
FIG. -4D-

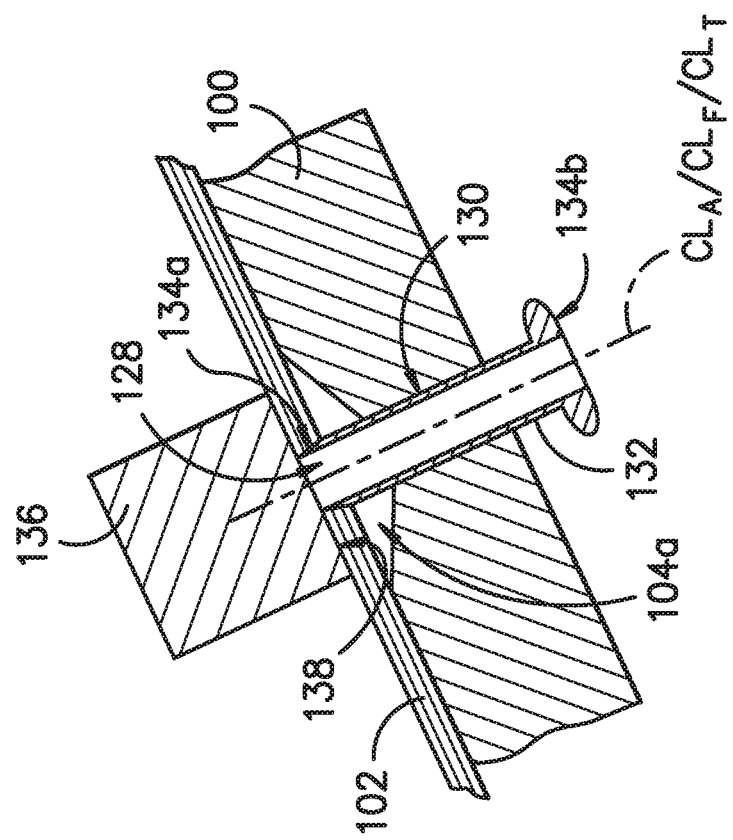
FIG. -5B-
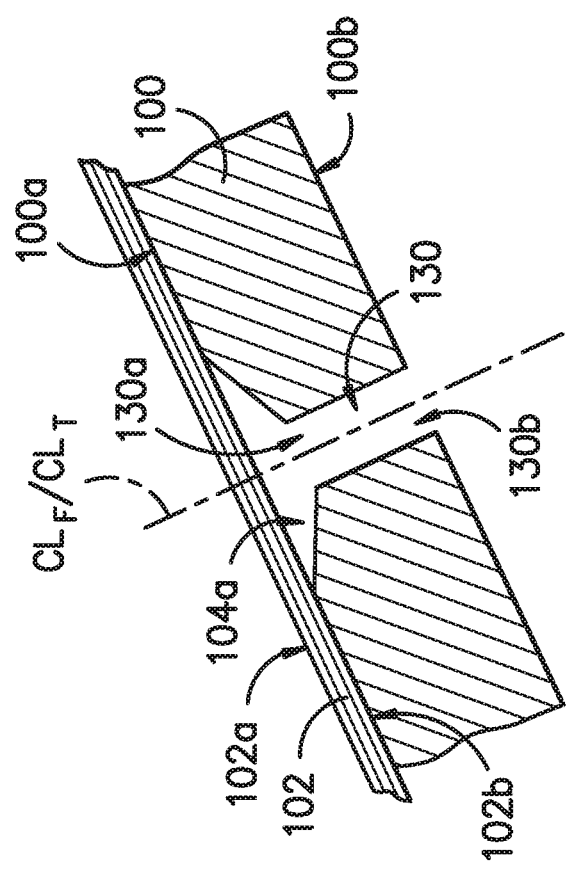
FIG. -5A-

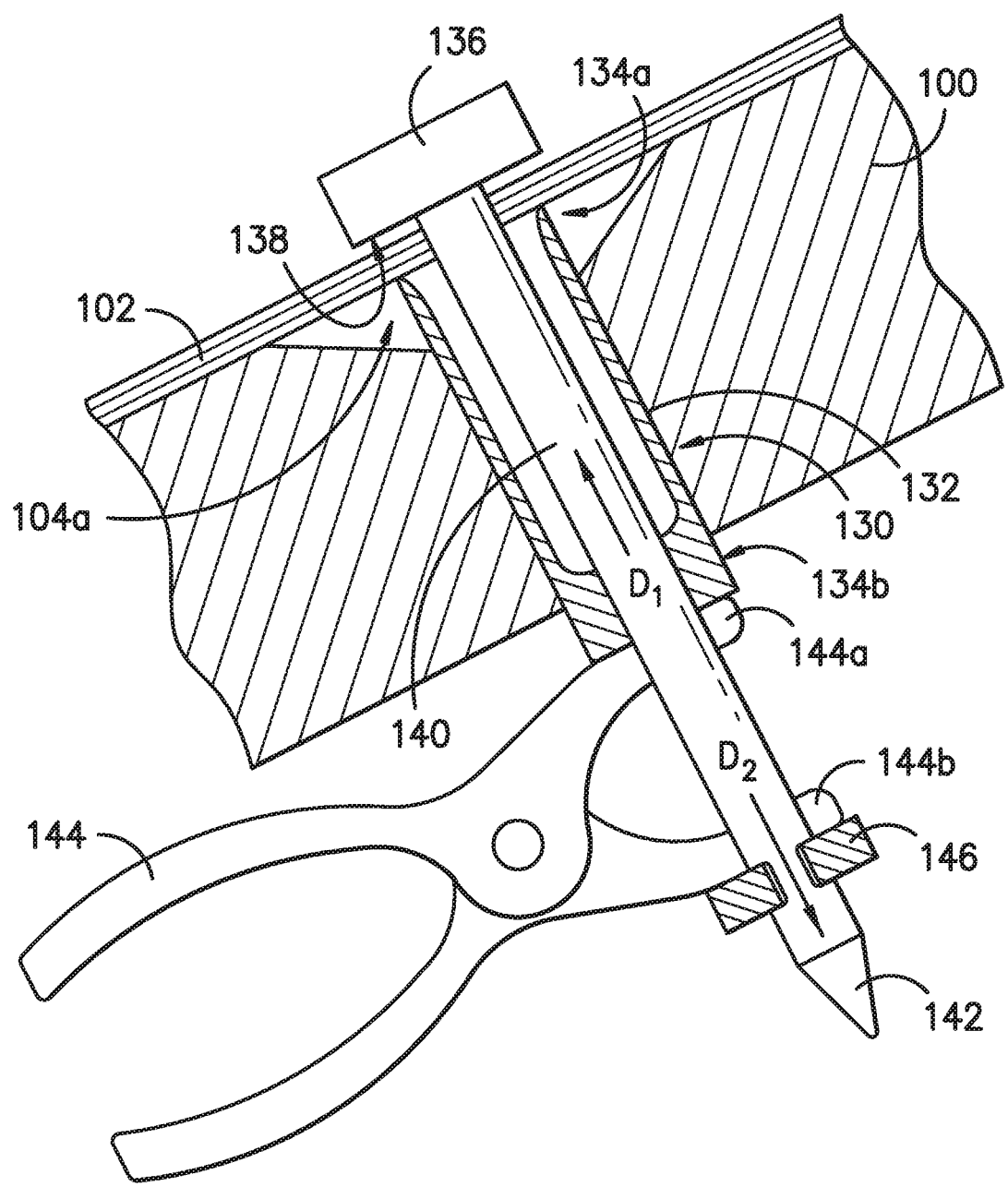
FIG. -6-

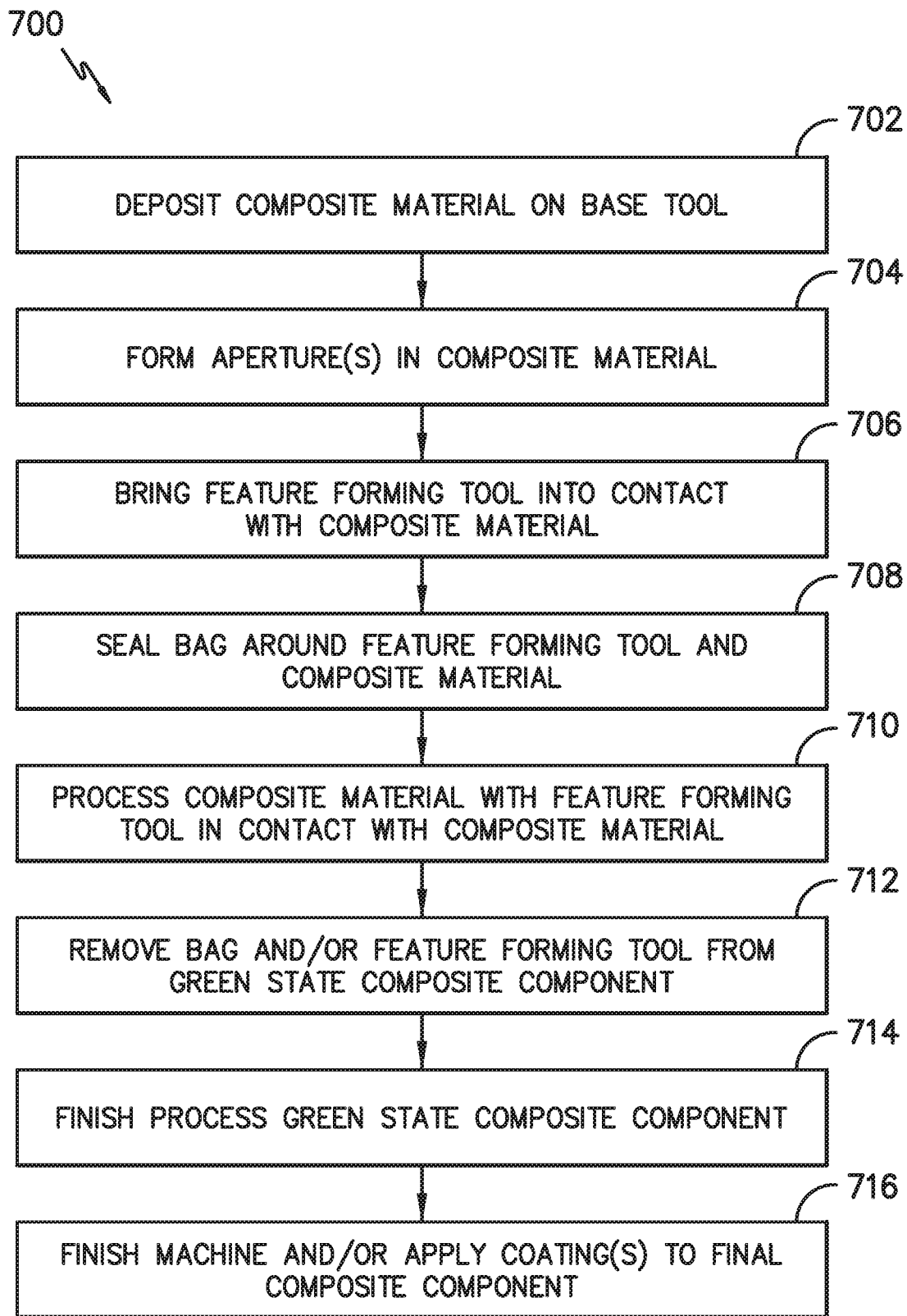
FIG. -7-

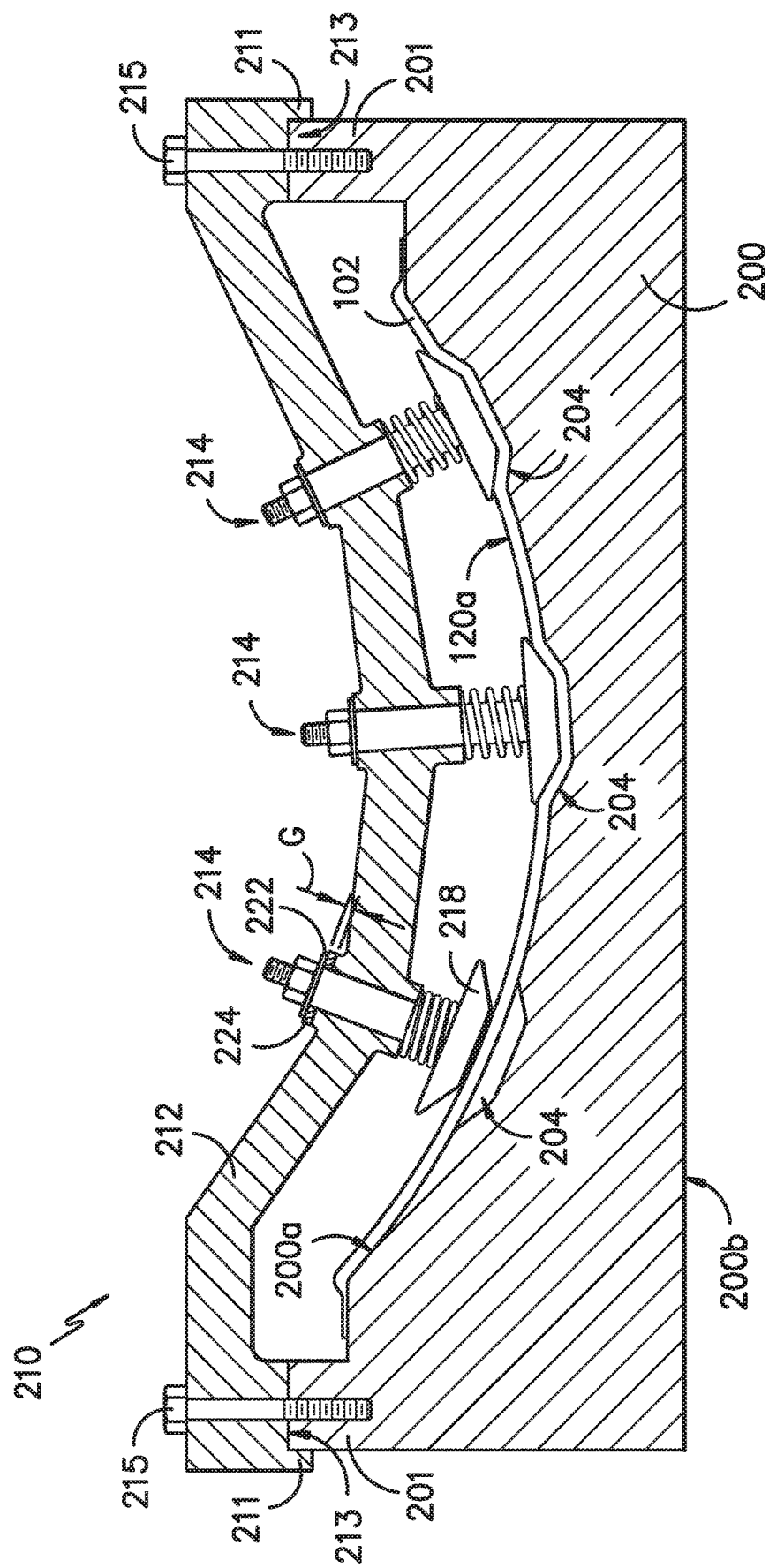
FIG. -8A-

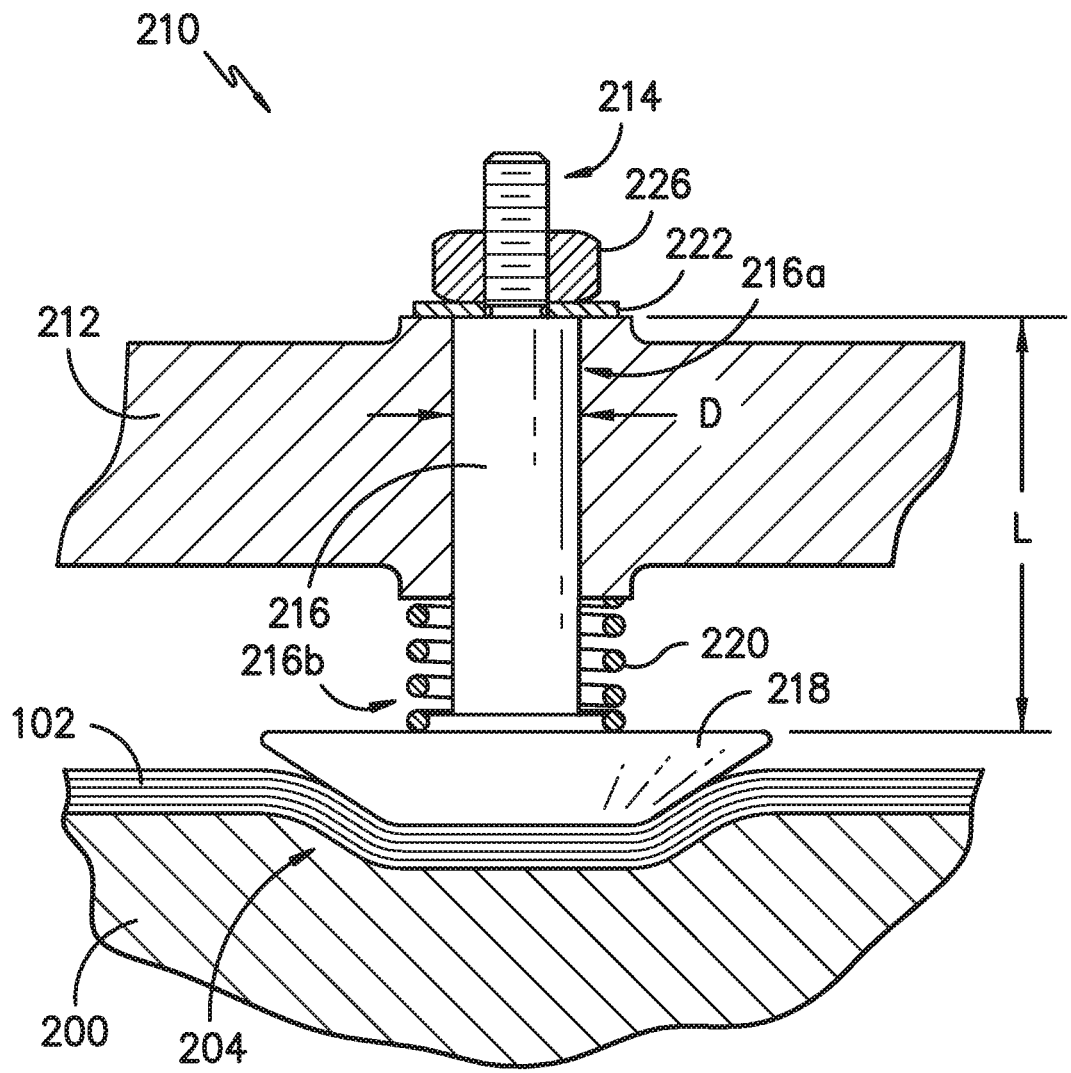
FIG. -8B-

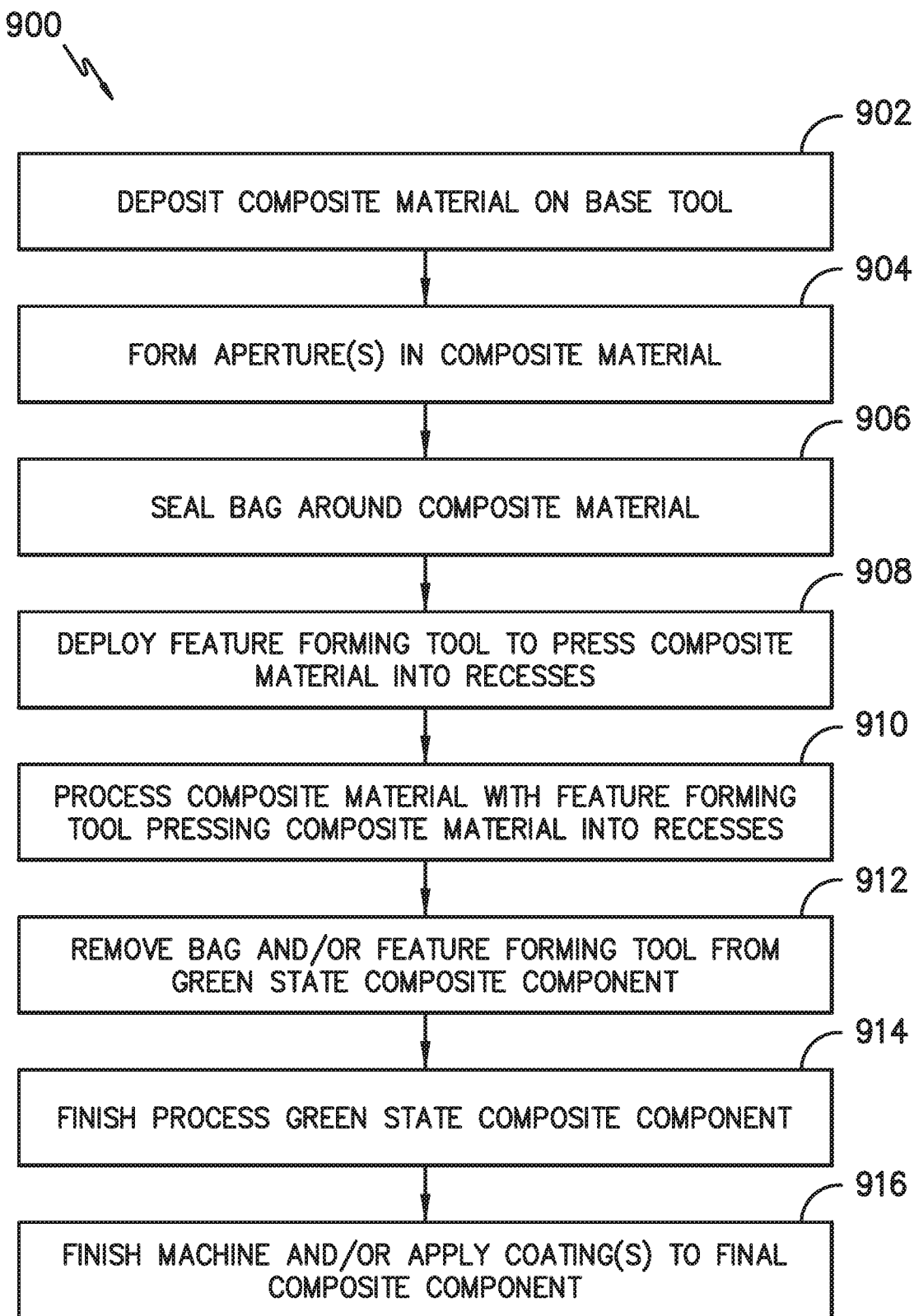
FIG. -9-

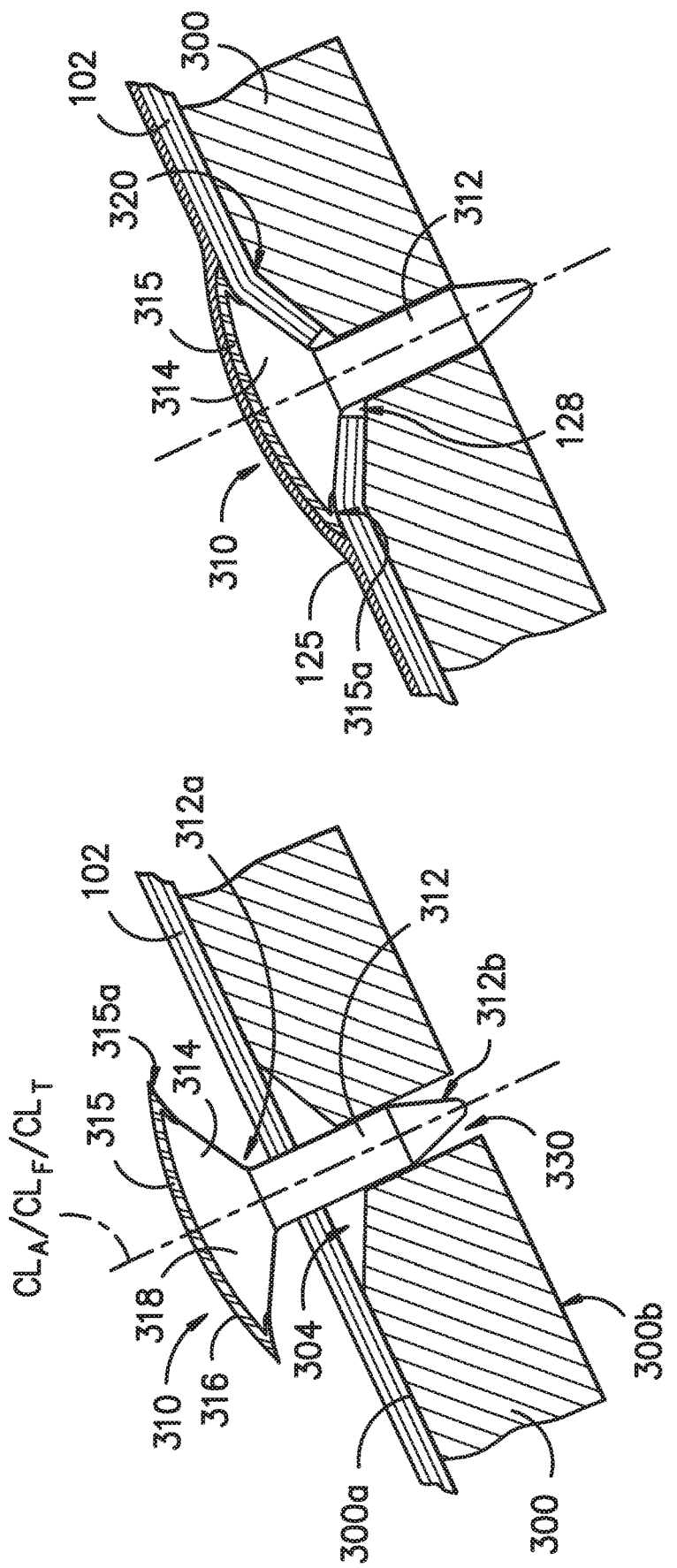

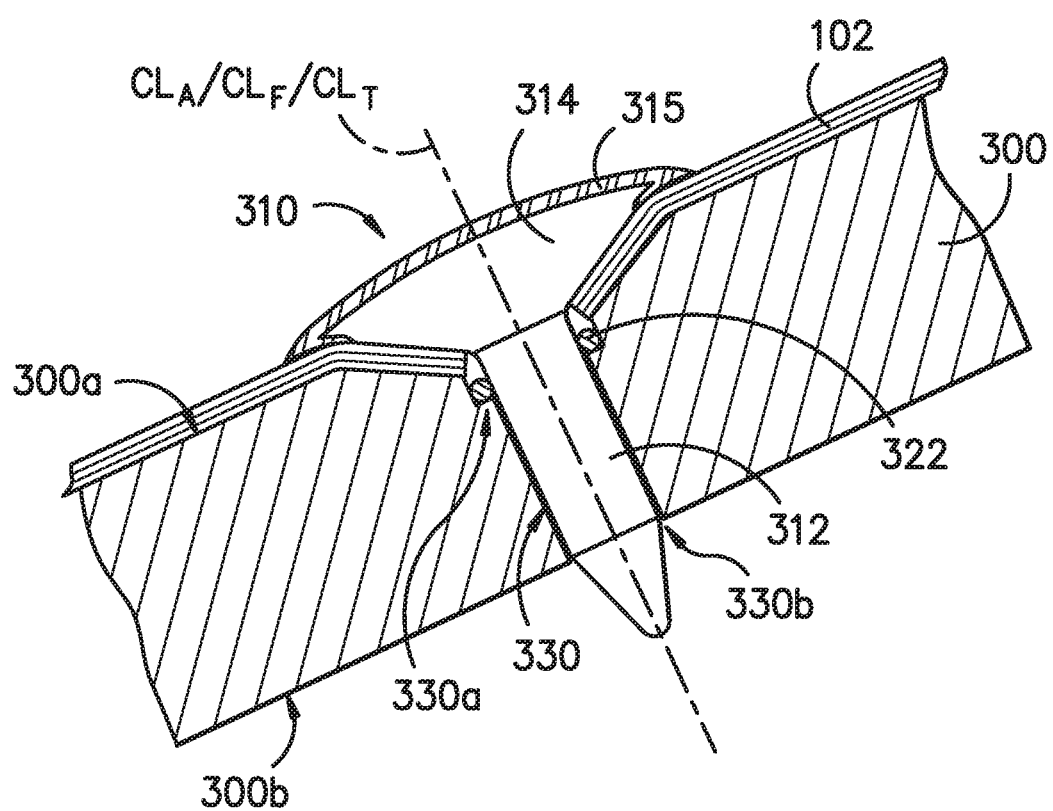
FIG. -10C-

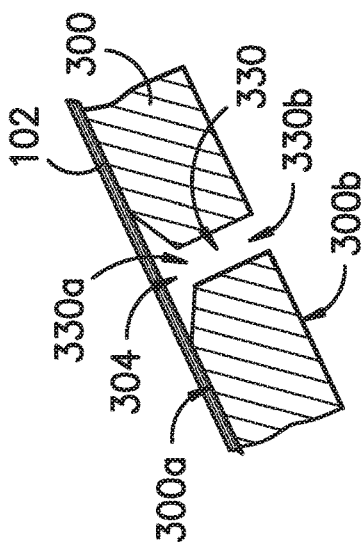
FIG. -11A-
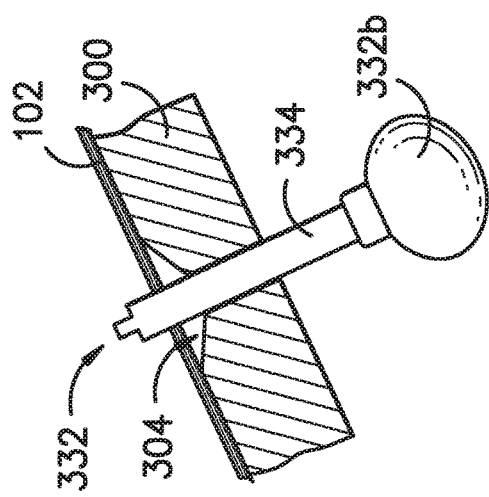
FIG. -11B-
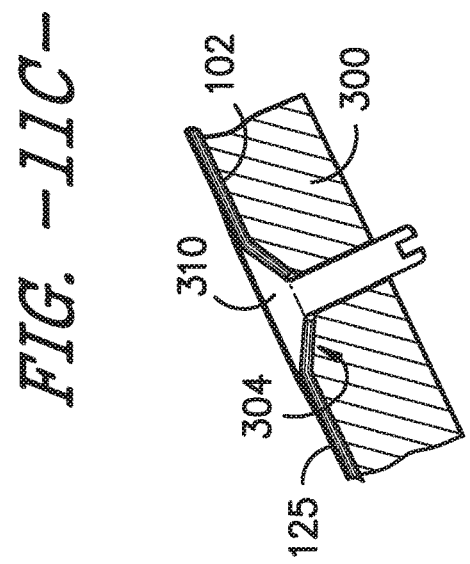
FIG. -11C-
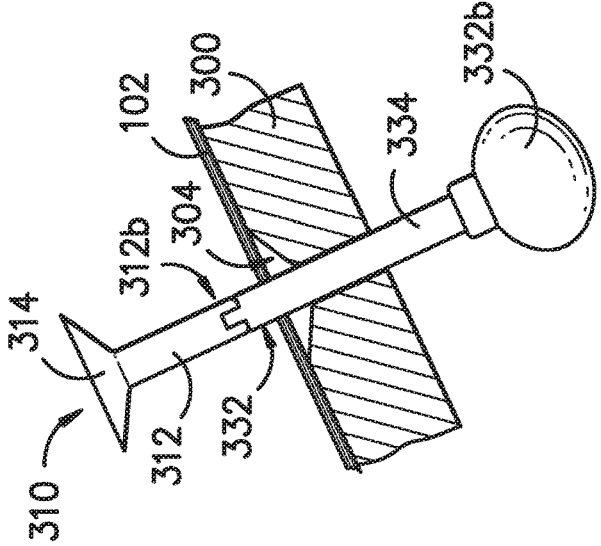
FIG. -11D-
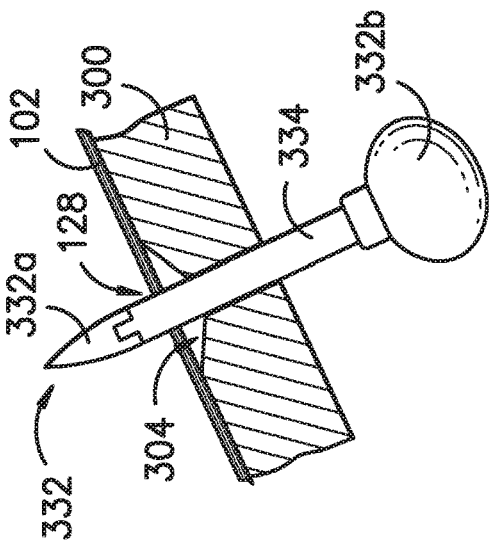
FIG. -11E-
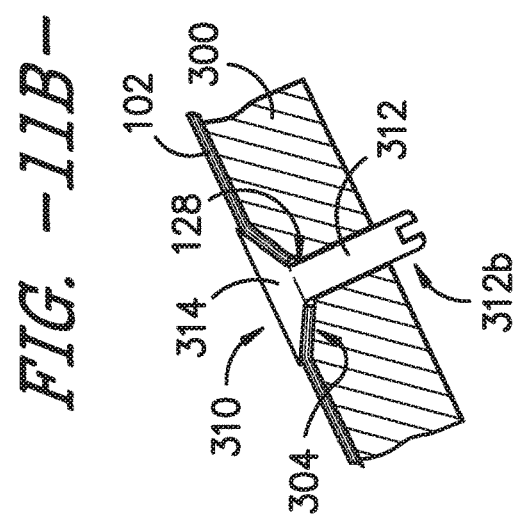
FIG. -11F-

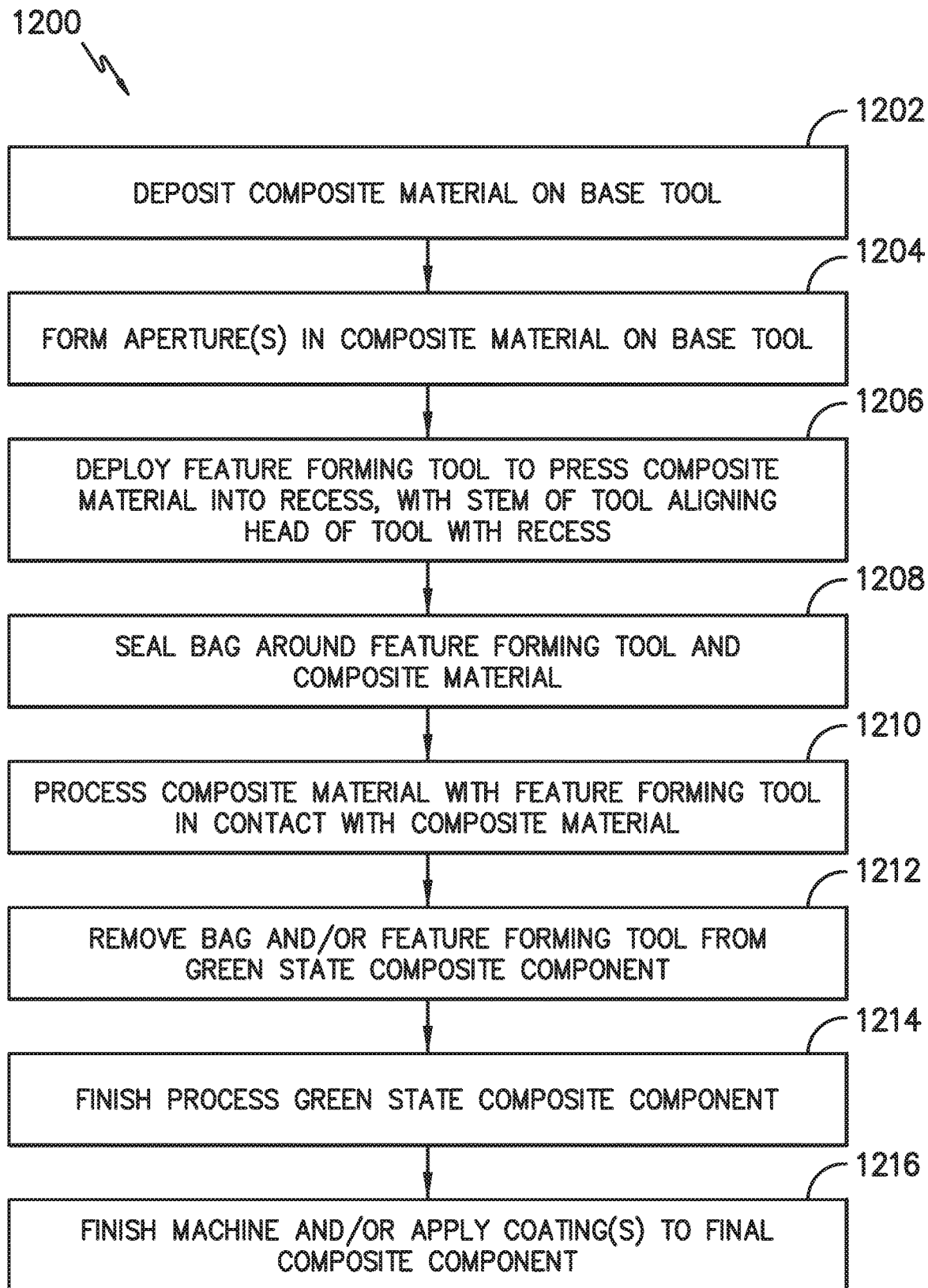
FIG. -12-

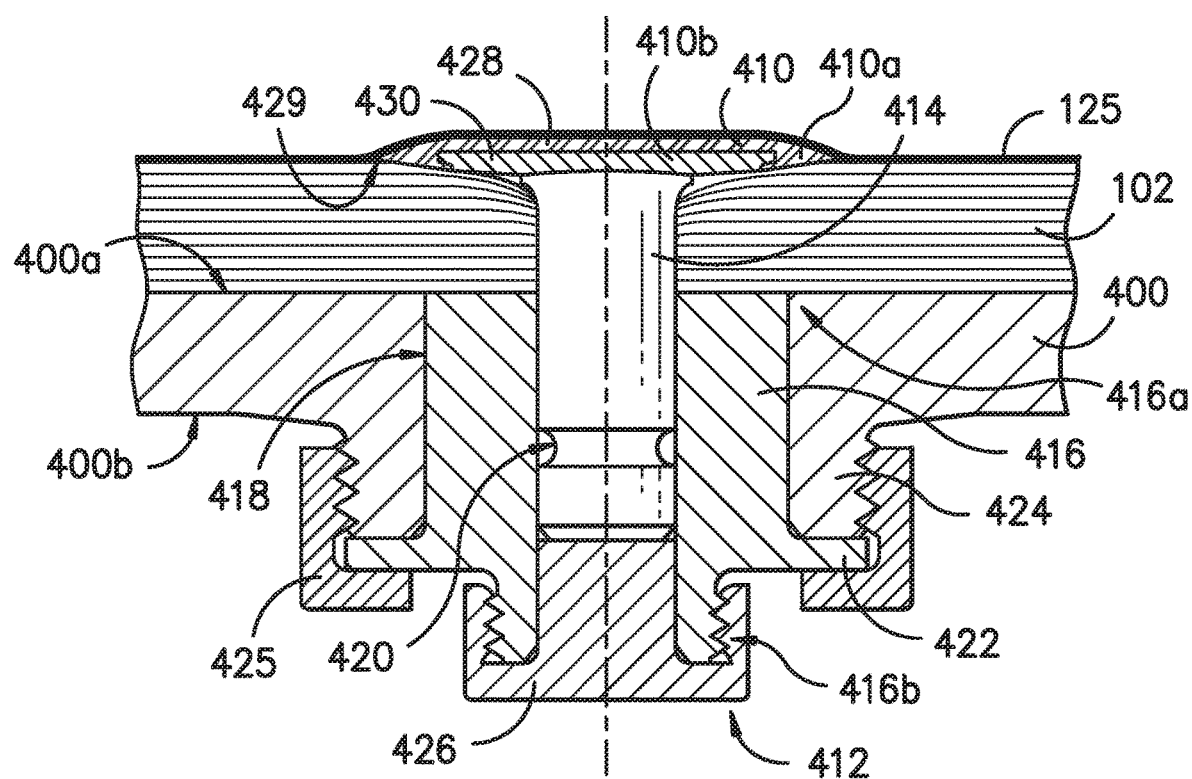
FIG. -13-

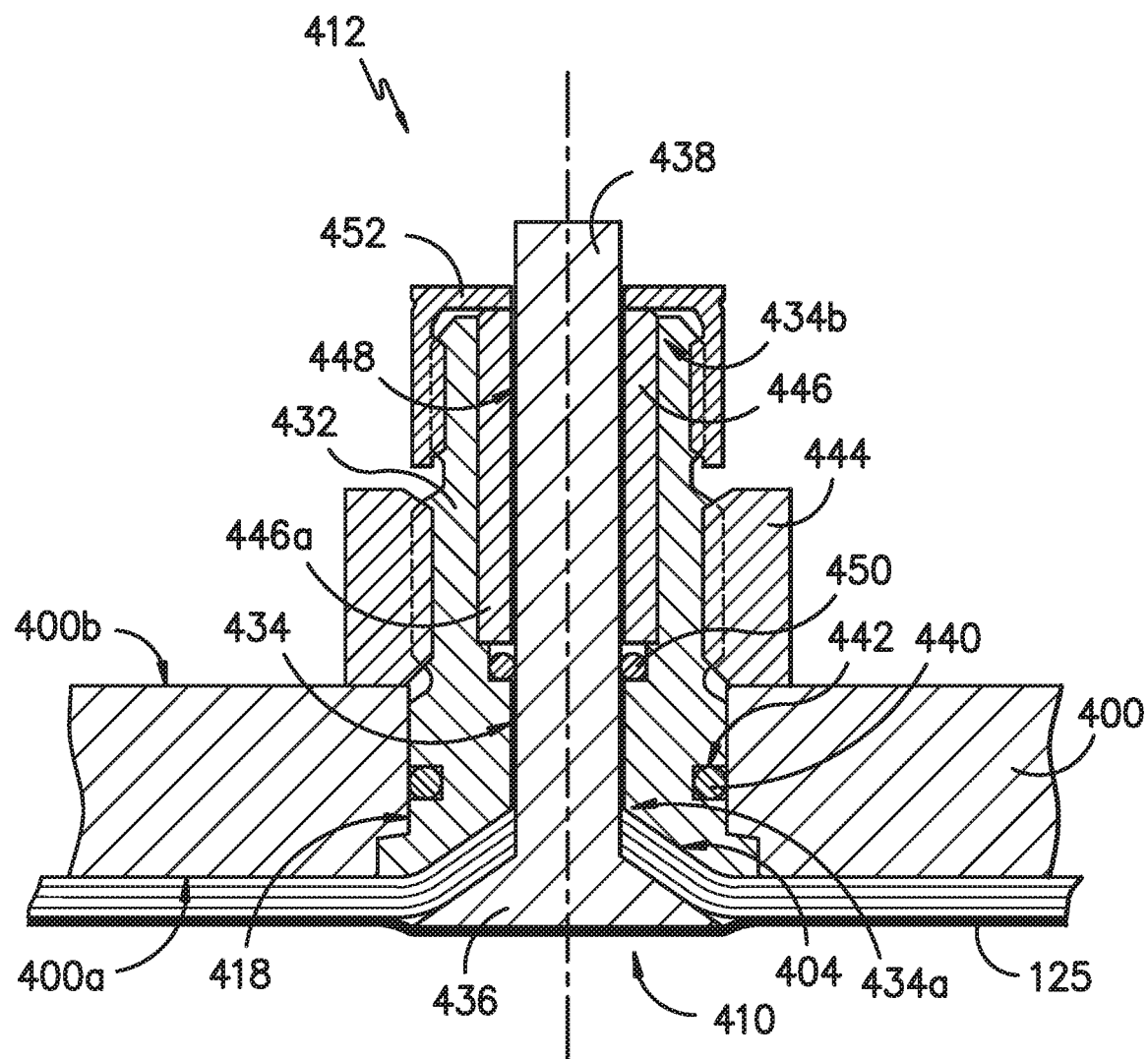
FIG. -14-

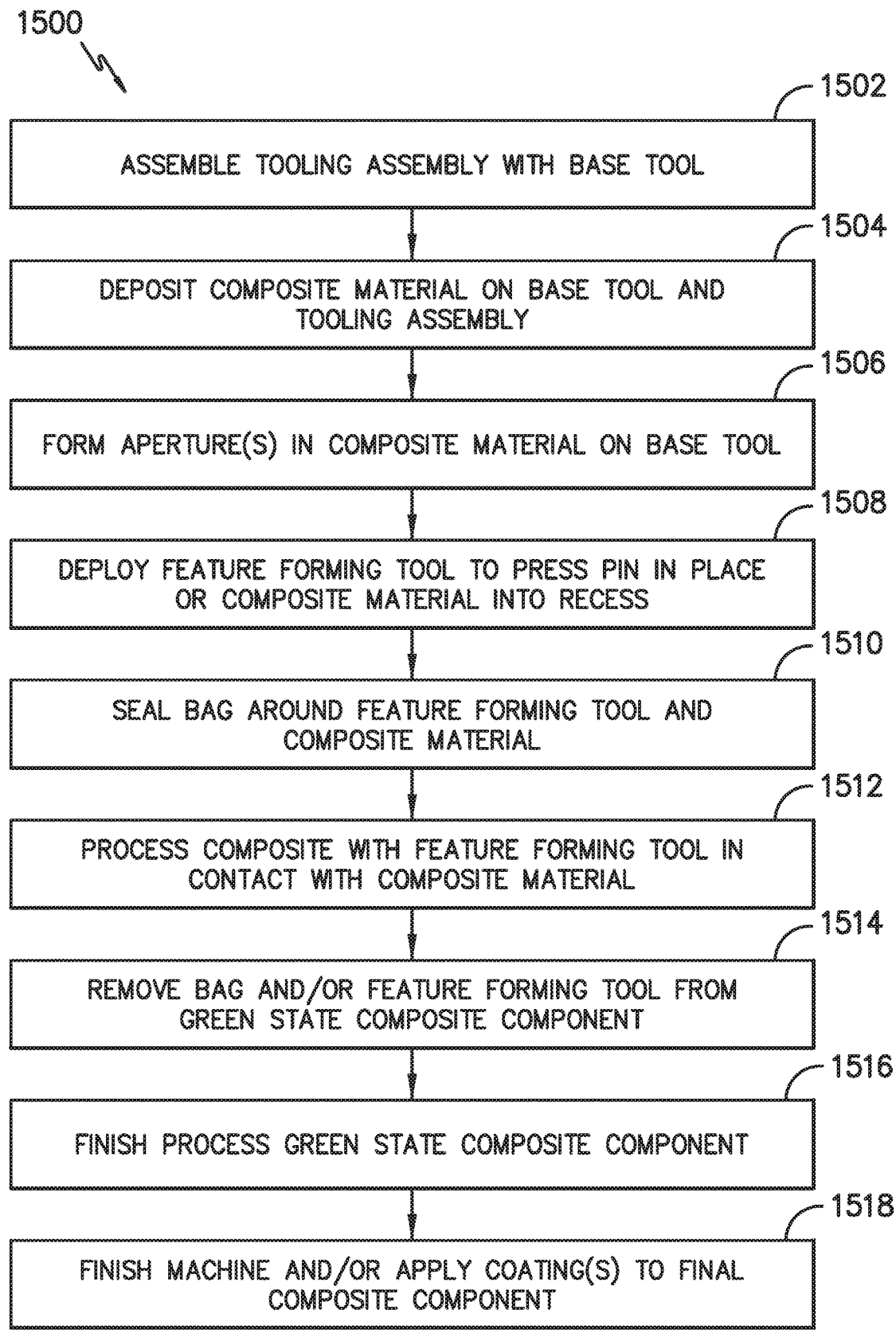
FIG. -15-

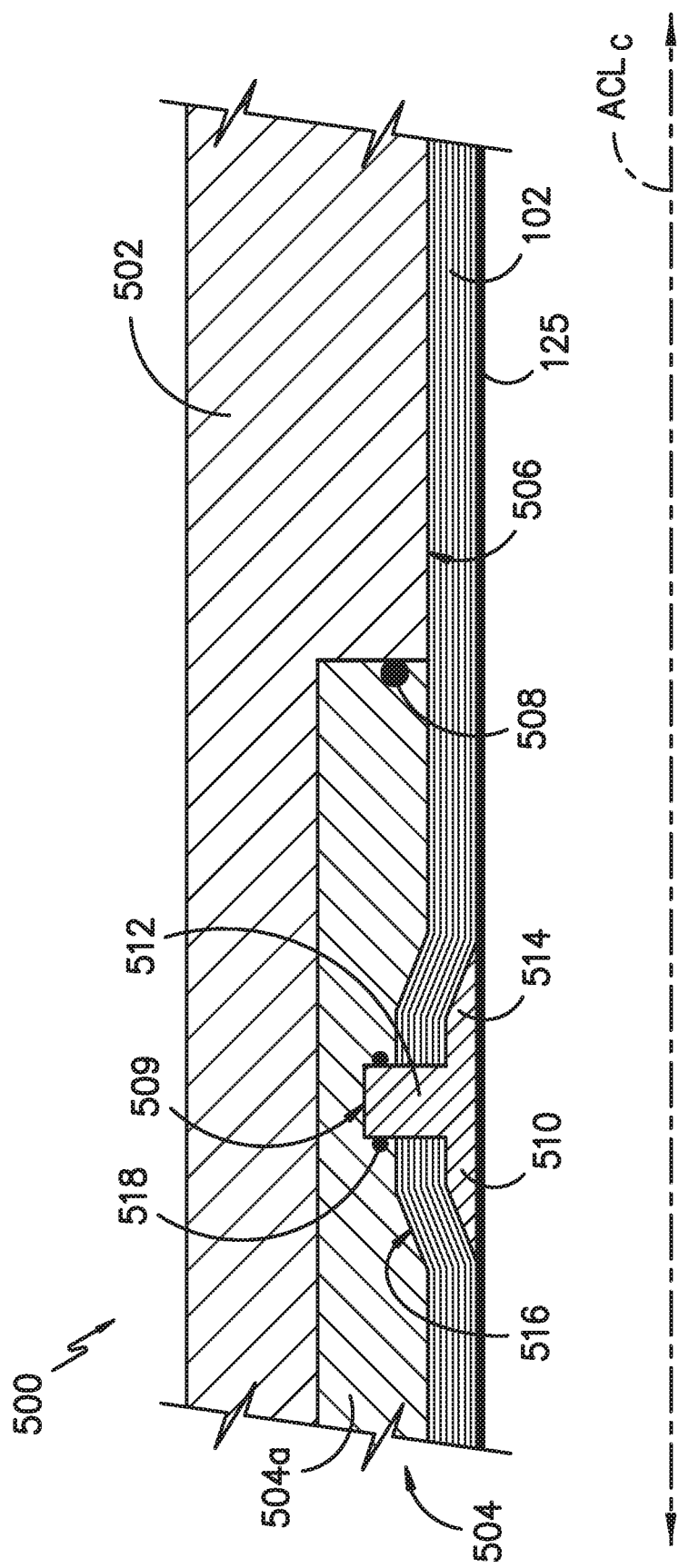
FIG. -16A-

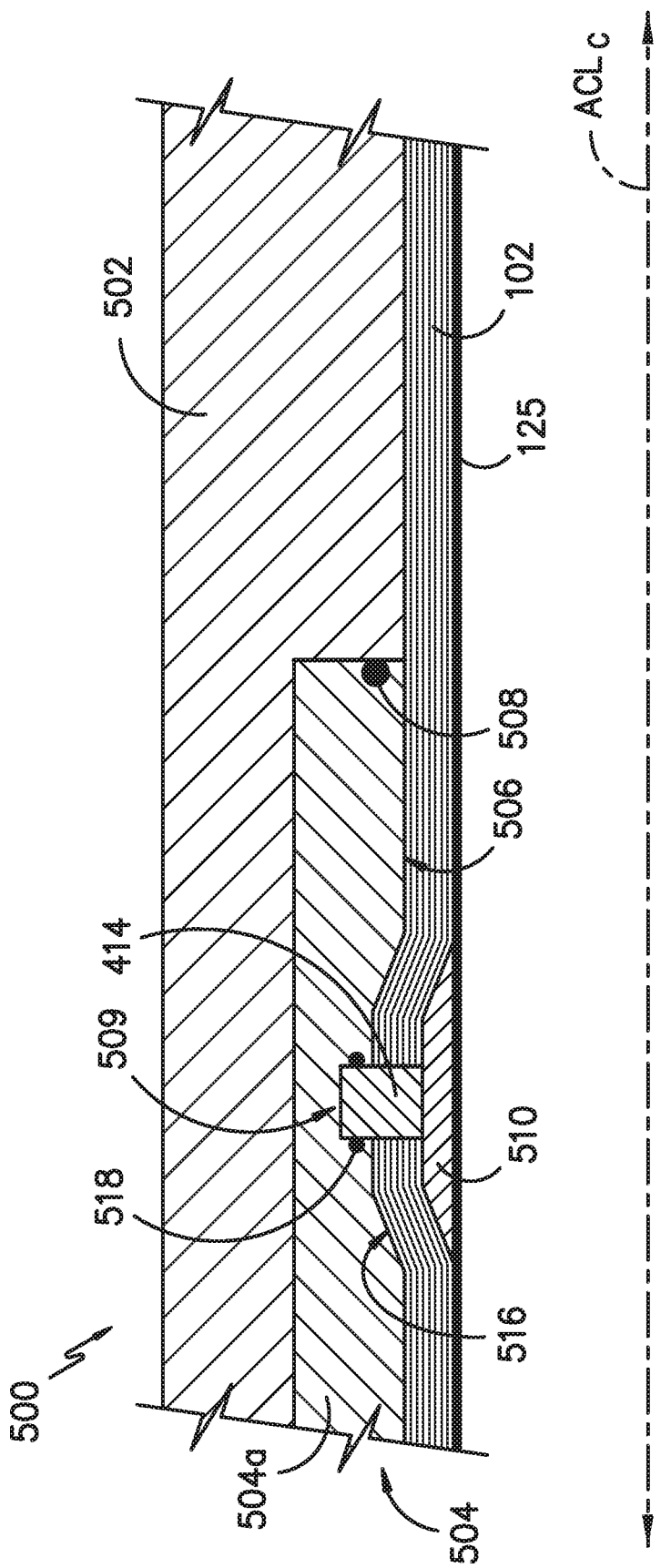
FIG. -16B-

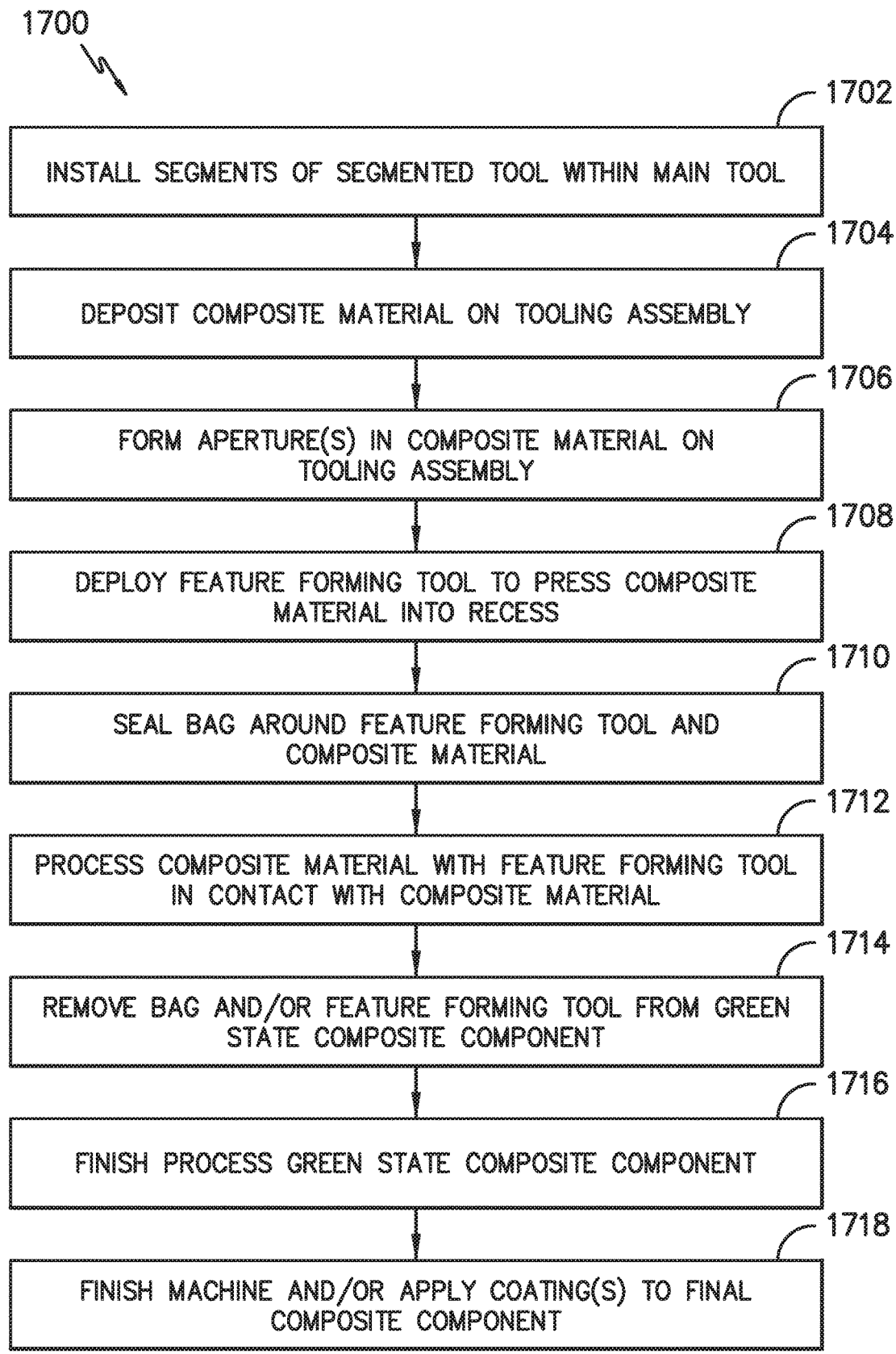
FIG. -17-

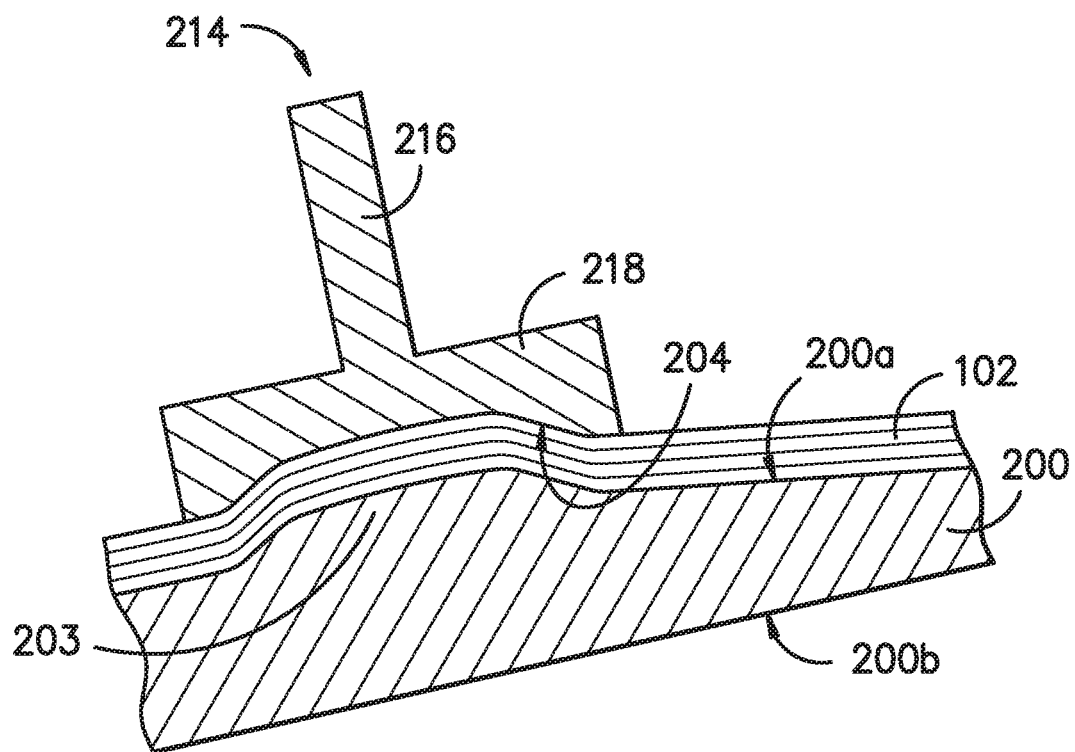
FIG. -18-
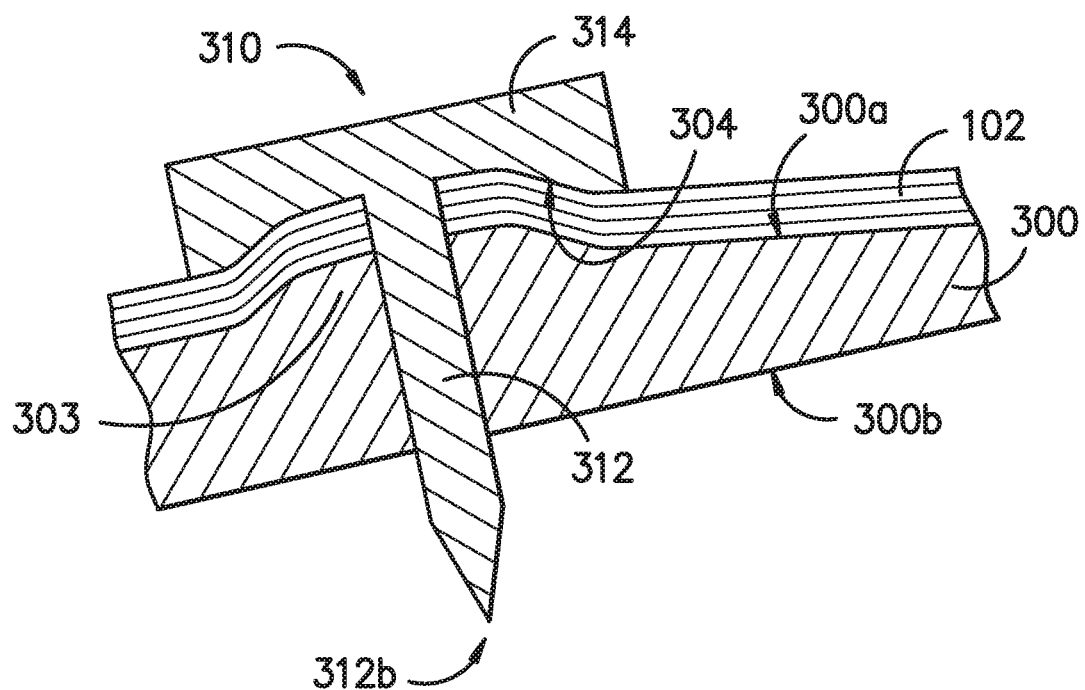
FIG. -19-

METHODS AND ASSEMBLIES FOR FORMING FEATURES IN COMPOSITE COMPONENTS

FIELD

The present subject matter relates generally to components made from composite materials. More particularly, the present subject matter relates to methods and assemblies for forming features in composite components, such as composite components for gas turbine engines.

BACKGROUND

More commonly, non-traditional high temperature composite materials, such as ceramic matrix composite (CMC) and polymer matrix composite (PMC) materials, are being used in applications such as gas turbine engines. Components fabricated from such materials have a higher temperature capability compared with typical components, e.g., metal components, which may allow improved component performance and/or increased engine temperatures. However, forming accurate and precise features, such as embossments, countersinks, counterbores, and the like, in composite components without weakening the composite material can be difficult. For example, such features typically are machined in the composite component after processing, which often requires additional composite material to provide an adequate machining area and cuts through layers of the composite material.

Improved methods and assemblies for forming features in composite components would be useful. In particular, methods and assemblies allowed formed in features of composite components, rather than machined in features, would be desirable. Formed in features of composite components may result in stronger composite components, as well as reduce the amount of composite material required to form a component, which may reduce labor and material costs.

BRIEF DESCRIPTION

Aspects and advantages of the invention will be set forth in part in the following description, or may be obvious from the description, or may be learned through practice of the invention.

In one exemplary embodiment of the present subject matter, a method for forming features in a composite component is provided. The method comprises depositing a composite material on a base tool; aligning an aperture forming tool with a tooling aperture in the base tool; inserting the aperture forming tool through the composite material to form an aperture in the composite material; deploying a feature forming tool to press the composite material into one or more recesses; and processing the composite material with the feature forming tool in contact with the composite material. The processed composite material forms a green state composite component. The feature forming tool comprises a feature forming head that is configured to form a feature of the composite component.

In another exemplary embodiment of the present subject matter, a method for forming features in a composite component is provided. The method comprises depositing a composite material on a base tool; forming an aperture through the composite material; bringing a feature forming head of a feature forming tool into contact with the composite material; and processing the composite material with the feature forming head in contact with the composite material. The processed composite material forms a green state composite component. The feature forming tool comprises a stem extending through the composite material and into the base tool, and the feature forming head is configured to form a feature of the composite component.

In a further exemplary embodiment of the present subject matter, a method for forming features in a composite component is provided. The method comprises depositing a composite material on a tooling assembly; forming an aperture through the composite material; inserting a pin into the aperture such that the pin extends through the composite material and into the tooling assembly; and processing the composite material with the pin extending through the composite material. The processed composite material forms a green state composite component. The pin is fixed in the green state composite component such that the green state composite component includes the pin.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic cross-section view of a composite component having a formed in countersink feature and a formed in counterbore feature.

FIG. 3 provides an exploded perspective view of a composite material deposited on a base tool and a feature forming tool for forming one or more features in the composite material, according to an exemplary embodiment of the present subject matter.

FIG. 3A provides a cross-section view of the composite material, base tool, and feature forming tool, taken along the line 3A-3A of FIG. 3.

FIG. 3B provides a cross-section view of the composite material, base tool, and feature forming tool, taken along the line 3B-3B of FIG. 3.

FIGS. 4A, 4B, 4C, and 4D provide cross-section views of a portion of the feature forming tool of FIG. 3, according to various exemplary embodiments of the present subject matter.

FIGS. 5A and 5B provide cross-section views of a base tool and an aperture forming tool for forming an aperture in a composite material deposited on the base tool, according to an exemplary embodiment of the present subject matter.

FIG. 6 provides a cross-section view of a base tool, an aperture forming tool, and a guide tool for forming an aperture in a composite material deposited on the base tool, according to an exemplary embodiment of the present subject matter.

FIG. 7 provides a flow diagram of a method for forming one or more features in a composite component according to an exemplary embodiment of the present subject matter.

FIGS. 8A and 8B provide cross-section views of a base tool and a feature forming tool for forming one or more features in a composite material deposited on the base tool, according to an exemplary embodiment of the present subject matter.

FIG. 9 provides a flow diagram of a method for forming one or more features in a composite component according to an exemplary embodiment of the present subject matter.

FIGS. 10A, 10B, and 10C provide cross-section views of a base tool and a feature forming tool for forming one or more features in a composite material deposited on the base tool, according to exemplary embodiments of the present subject matter.

FIGS. 11A through 11F provide a cross-section view of a base tool, an aperture forming tool, and a feature forming tool for forming an aperture and one or more features in a composite material deposited on the base tool, according to an exemplary embodiment of the present subject matter.

FIG. 12 provides a flow diagram of a method for forming one or more features in a composite component according to an exemplary embodiment of the present subject matter.

FIG. 13 provides a cross-section view of a base tool, a tooling assembly, a pin, and a feature forming tool for forming one or more features in a composite material deposited on the base tool, according to an exemplary embodiment of the present subject matter.

FIG. 14 provides a cross-section view of a base tool, a tooling assembly, and a feature forming tool for forming one or more features in a composite material deposited on the base tool, according to an exemplary embodiment of the present subject matter.

FIG. 15 provides a flow diagram of a method for forming one or more features in a composite component according to an exemplary embodiment of the present subject matter.

FIGS. 16A and 16B provide cross-section views of a tooling assembly and a feature forming tool for forming one or more features in a composite material deposited on the base tool, according to exemplary embodiments of the present subject matter.

FIG. 17 provides a flow diagram of a method for forming one or more features in a composite component according to an exemplary embodiment of the present subject matter.

FIGS. 18 and 19 provide cross-section views of a base tool and a feature forming tool for forming one or more features in a composite material deposited on the base tool, according to exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that turbofan engine 10 is provided by way of example only, and the present subject matter also may be applied to other engine configurations. Further, the present subject matter described in greater detail below also may be applicable to other systems, machines, mechanisms, structures, or the like. The use of turbofan engine 10 provides a frame of reference, and the present subject matter need not be limited in applicability to only turbofan engines or similar structures.

In some embodiments, components of turbofan engine 10, particularly components within or defining the hot gas path 78, may comprise a composite material, such as a ceramic matrix composite (CMC) material, a polymer matrix composite (PMC) material, or other suitable composite material having high temperature capability. Composite materials generally comprise a fibrous reinforcement material embedded in matrix material, such as polymer or ceramic material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

As stated, it may be desirable to form components within or defining the hot gas path 78, such as the jet exhaust nozzle section 32, from composite materials such as CMC or PMC materials. Often, the components formed from composite materials require features of a certain shape or style, e.g., attachment features such as countersunk holes to allow the composite component to be attached to another component. For instance, the jet exhaust nozzle section 32 may comprise an exhaust case, as well as a composite exhaust liner that preferably is attached to the exhaust case. Thus, one or more features must be defined in the composite exhaust liner for attaching the liner to the case. Rather than machining such features into the composite exhaust liner after the liner is fabricated, using the subject matter described herein, these features can be formed in the liner during the fabrication process.

Referring now to FIGS. 2 through 7, assemblies and methods for forming features in composite components will be described in greater detail. As previously mentioned, composite components generally may be formed by laying up plies of a composite material, such as CMC plies or PMC plies, in a desired shape and curing the plies to form a composite component. Typically, the composite plies are laid up on a tool or mold to help define the desired shape. As depicted in FIG. 3, in an exemplary embodiment of the present subject matter, a base tool 100, on which a plurality of composite plies 102 may be laid up, comprises one or more recesses 104 that help define one or more features of a composite component 90. As shown in FIG. 3A, a first recess 104a may be configured for defining a countersink feature 106 in the composite component 90 (FIG. 2) while a second recess 104b, illustrated in FIG. 3B, may be configured for defining a counterbore feature 108 in the composite component 90 (FIG. 2). Other recesses 104 also may be used to define additional and/or different features in the composite component 90. For example, the features may be oblong or polygonal and/or skewed or tilted with respect to one or more centerlines or axes of the composite component. Further, the features may be one or more features for locating the composite component within an assembly, e.g., one or more locating features for locating an exhaust liner within an exhaust assembly.

FIGS. 3, 3A, and 3B further illustrate that the composite plies 102 are laid up on a proximal surface 100a of the base tool 100; the base tool 100 also comprises a distal surface 100b opposite the proximal surface 100a. Once the plurality of composite plies 102 is laid up on the base tool 100, a feature forming tool 110 may be brought into contact with the plurality of composite plies 102 that are supported on the base tool 100. The feature forming tool 110 comprises a sheet 112 having one or more inserts or raised portions 114 for forming one or more features of the composite component, such as the countersink feature 106 and the counterbore feature 108 depicted in FIG. 2. For example, in the illustrated exemplary embodiment, a first insert 114a (FIG. 3A) is configured to define the countersink feature 106, and a second insert 114b (FIG. 3B) is configured to define the counterbore feature 108. The sheet 112 may be formed from a first material 116, and the one or more inserts may be formed from a second material 118 that is harder than the first material. In exemplary embodiments, the first material 116 is silicone, such that the sheet 112 is formed from silicone and the inserts 114 are formed from a material 118 that is harder than silicone, e.g., a metal, polymer, or elastomer having a greater Shore hardness than silicone. Further, as illustrated in FIG. 3B, the base tool 100 may include one or more alignment features 101 that help align the sheet 112 and inserts 114 with the base tool 100 and recesses 104.

As shown in FIGS. 4A, 4B, 4C, and 4D, a variety of inserts 114 or insert configurations may be used in the feature forming tool 110. Referring to FIG. 4A, in some exemplary embodiments, an insert 114 may be formed from the same material as the sheet 112. That is, the sheet 112 and the one or more inserts 114 may be formed from the first material 116, which may be silicone in exemplary embodiments. In such embodiments, the inserts 114 may be referred to as raised portions 114, wherein the portions 114 protrude or extend from a surface 122 of the sheet 112. Turning to FIG. 4B, in other exemplary embodiments, an insert 114 is formed from the second material 118 while the sheet 112 is formed from the first material 116. In the embodiment illustrated in FIG. 4B, the insert 114 has a side 120 that extends away from and is non-planar with respect to the surface 122 of the sheet 112, i.e., the side 120 is not parallel to or within the plane of the sheet surface 122. The first material 116 of the sheet 112 extends partially along the side 120 of the insert 114. In other embodiments, such as depicted in FIG. 4C, the first material 116 of the sheet 112 extends fully or completely along the side 120 of the insert 114, i.e., to a surface 124 of the insert 114 that is parallel with respect to the sheet surface 122. It will be appreciated that generally frustoconical-shaped inserts 114 may have one non-planar side 120 that extends away from the sheet surface 122, but inserts 114 having other shapes may have more than one non-planar side 120 that extends away from the sheet surface 122, and the first material 116 may extend partially or fully along at least one of the sides 120. Turning to FIG. 4D, in yet other embodiments, an insert 114 is a thin disk of the second material 118, and the first material 116 extends fully along a perimeter P of the thin disk insert 114 to the insert surface 124 that generally is parallel to the sheet surface 122. As shown in FIG. 4D, the perimeter P of the insert 114 extends away from and is non-planar with respect to the surface 122 of the sheet 112. Of course, the inserts 114 illustrated in FIGS. 4A, 4B, 4C, and 4D are by way of example only, and feature forming tool 110 also may comprise inserts 114 having other shapes and/or configurations.

FIGS. 4A, 4B, 4C, and 4D further illustrate that the feature forming tool 110 comprises a transition area 126 between the sheet 112 and the insert 114 protruding from the sheet 112. More particularly, in each embodiment, the feature forming tool 110 gradually and smoothly transitions from the planar sheet surface 122 to the insert 114, which extends away from the surface 122. Further, where the first material 116 of the sheet 112 extends partially along the insert side 120 as shown in FIG. 4B, the first material 116 extending along the side 120 is relatively thin in depth, e.g., to avoid a step in the transition area 126 as the feature forming tool 110 transitions from the first material 116 of the sheet 112 to the second material 118 of the insert 114 along the insert side 120. That is, the relatively thin layer of the first material 116 that extends along the side 120 generally smoothly transitions to the second material 118 of the insert 114, thereby avoiding a step in the surface defined by the first material 116 and the second material 118 that is parallel to the side 120.

Turning now to FIGS. 5A and 5B, the features of the composite component also may comprise one or more apertures 128, e.g., an aperture 128 may be formed generally in the center of a countersink feature 106 and/or a counterbore feature 108 (FIG. 2), i.e., such that a centerline $CL_A$ of the aperture 128 is the same as a centerline $CL_F$ of the feature 106, 108, or an aperture 128 may be formed in or as another feature of the composite component 90. Referring to FIG. 5A, in one embodiment, the base tool 100 comprises a tooling aperture 130 extending from the distal surface 100b of the base tool 100 to one of the recesses 104, e.g., first recess 104a. More particularly, the tooling aperture 130 extends from a distal end 130b at the base tool distal surface 100b to a proximal end 130a at the recess 104a. The tooling aperture 130 has a centerline $CL_T$, which is co-extensive with or the same as the feature centerline $CL_F$. As such, the tooling aperture 130 in base tool 100 may be used to form an aperture 128 substantially in the center of the feature to be defined by the recess 104 and the feature forming tool 110.

In FIG. 5A, a plurality of composite plies 102 are laid up on the base tool 100 over the tooling aperture 130. As shown in FIG. 5B, an aperture forming tool 132, such as a hole punch tool or the like, may be inserted through the tooling aperture 130 to form or punch an aperture 128 in the composite plies 102 laid up on the base tool 100. For instance, the aperture forming tool 132 has a sharp end 134a for cutting through the plies 102; the sharp end 134a is opposite a blunt, distal end 134b. A stop 136, e.g., an anvil or the like, may be positioned against the composite plies 102 opposite the recess 104a, i.e., against an outermost surface 102a of the plies 102. The sharp end 134a of the tool 132 is driven through the plies and against the stop 136 to form the aperture 128. The stop 136, for example, helps prevent deformation, tearing, wrinkling, etc. of the plies 102 as the aperture 128 is formed in the plies 102. As such, the stop 136 preferably is of sufficient weight to resist the impact of the aperture forming tool 132 against the stop 136 and has a surface 138 positioned against the plies 102 that does not stick to the plies 102 and does not dull the sharp end 134a of the tool 132. It will be understood that the centerline $CL_A$ of the aperture 128 formed by tool 132 is substantially coextensive with the centerline $CL_T$ of the tooling aperture 130, as well as the centerline $CL_F$ of the feature 106. Accordingly, the aperture(s) 128 also may help align a feature forming tool with the composite plies 102, e.g., by aligning a centerline line of each insert 114 with an aperture centerline $CL_A$, the aperture(s) 128 may help align each insert 114 of the feature forming tool 110 with the composite plies 102 such that the inserts 114 may properly guide the plies 102 into the base tool recesses 104.

FIG. 6 illustrates other exemplary structures for forming an aperture 128 in the composite plies 102 laid up on the base tool 100. In some embodiments, a stem 140 having a sharp end 142 is attached to the stop 136. The sharp end 142 of the stem 140 is inserted through the plies 102 laid up on the base tool 100 and into the tooling aperture 130. The aperture forming tool 132 fits over the stem 140 and into the tooling aperture 130. A guide tool 144 having a first arm 144a and a second arm 144b is positioned against the distal end 134b of the tool 132 and a collar 146 located near the sharp end 142 of the stem 140. The collar 146 may not fully surround the stem 140 but, for example, may be a C-shaped clip or the like that partially surrounds the stem. When actuated, e.g., when squeezed, the second arm 144b of the guide tool 144 pushes the stem 140 in a second direction $D_2$ away from the base tool 100, and the first arm 144a of the guide tool 144 pushes the aperture forming tool 132 in a first direction $D_1$ toward the composite plies 102 laid up on the base tool 100. Thus, the guide tool 144 drives the sharp end 134a of the aperture forming tool 132 against the stop 136, as described above with respect to FIG. 5B, to form the aperture 128 in the plies 102. It will be appreciated that the collar 146, therefore, provides a surface against which the guide tool second arm 144b can act as the first arm 144a acts against the distal end 134b of the aperture forming tool 132 and that the first direction $D_1$ is substantially opposite the second direction $D_2$.

FIG. 7 provides a flow diagram illustrating a method for forming features in composite components according to an exemplary embodiment of the present subject matter. The exemplary method 700 may be used to form a composite component having one or more formed in features, i.e., features defined in the component without machining the features in the component after processing the composite material 102. As shown at 702 in FIG. 7, the exemplary method 700 includes depositing a composite material 102 on the base tool 100 having recesses 104, e.g., as shown in FIGS. 3, 3A, and 3B. In some embodiments, the composite material 102 is in the form of a plurality of composite plies 102, which, as generally described above, may be formed from composite tapes having a composite matrix material embedded within a reinforcement material and may be laid up on the base tool 100. In other embodiments, the composite material 102 is in a form other than composite plies and, for example, may be sprayed or otherwise deposited on the base tool 100.

As illustrated at 704 in FIG. 7, after the composite material 102 is deposited on the base tool 100, one or more apertures 128 may be formed in the composite material 102 as described with respect to FIGS. 5A, 5B, and 6. For instance, an aperture forming tool 132 may be inserted through a tooling aperture 130 in the base tool 100 and then driven through the composite material 102 on the base tool 100 and against a stop 136. The aperture forming tool 132 may have a sharp end 134a that forms an aperture 128 in the composite material 102 as the tool is driven through the material. In other embodiments, particularly where the composite material 102 is a plurality of composite plies, the aperture(s) 128 may be cut in each ply 102 before laying up the plies on the base tool 100, such that the aperture(s) 128 in each ply 102 are aligned as the plies 102 are laid up on the base tool 100. Further, as previously described, the centerline $CL_A$ of each aperture 128 may be the same as the centerline $CL_F$ of the respective feature 106, 108, etc. such that the aperture(s) 128 may help align a feature forming tool with the base tool recess(es) 104.

Next, a feature forming tool 110 is brought into contact with the composite material 102, as shown at 706. As described above, the feature forming tool 110 comprises one or more inserts 114 for forming one or more features of a composite component, such as an engine exhaust liner having one or more countersink 106, counterbore 108, locating, or other features. The feature forming tool 110 is brought into contact with the composite material 102 on the base tool 100 such that the inserts 114 of the tool 110 push or guide the composite material 102 into the recesses 104 defined in the base tool 100, as generally shown in FIGS. 3A and 3B.

Then, as shown at 708 in FIG. 7, a bag 125 may be sealed around the feature forming tool 110 and the composite material 102, with the feature forming tool 110 remaining in contact with the composite material 102. That is, the feature forming tool 110 and composite material 102 may be bagged for processing, e.g., in an autoclave, as is generally known in the art. In an exemplary embodiment, bagging the tool 110 and composite material 102, with the tool 110 in contact with the composite material 102, includes enclosing or encasing the tool 110 and material 102 within a vacuum bag 125, such as a flexible bladder or the like formed from any suitable material. A vacuum may be drawn within the vacuum bag 125 through a vacuum port connected to a vacuum pump, e.g., to remove air and volatiles from the material 102. In some embodiments, the bag 125 may be omitted, e.g., where the feature forming tool 110 adequately seals the composite material 102 between the feature forming tool 110 and the base tool 100, such that method 700 does not include sealing the bag 125 around the feature forming tool 110 and the composite material 102 on the base tool 100.

Next, as depicted at 710 in FIG. 7, the composite material 102 is processed, e.g., compacted and autoclaved or, more generally, debulked and/or processed to reduce porosity, with the feature forming tool 110 in contact with the composite material 102. The processed composite material forms a green state composite component having the features formed by the interaction between the feature forming tool inserts 114 and the base tool recesses 104. For example, the green state composite component has been compacted and cured but may retain some solvents used in forming the composite material and may also contain some voids in the composite material. As shown at 712 and 714 in FIG. 7, after processing, the bag 125 (if used) and the feature forming tool 110 are removed from the green state composite component, and then the green state composite component undergoes finish processing to produce the composite component 90 having one or more features, such as a countersink feature 106 and/or a counterbore feature 108.

Finish processing of the green state component may include one or more processes that may differ from one implementation of method 700 to another depending on the type of composite material 102. For example, where the composite material 102 is a CMC material, finish processing as shown at 714 in FIG. 7 may include firing (or burn-off) and densification. More specifically, the green state composite component may be fired to produce a fired composite component, e.g., the green state composite component, with the bag 125 and/or feature forming tool 110 removed, may be placed in a furnace to burn off any solvents used in forming the CMC plies and to decompose binders in the solvents. Then, the fired composite component may be densified, e.g., the fired CMC component may be placed in a furnace with silicon to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component. Optionally, as shown at 716 in FIG. 7, after finish processing the composite component may be finish machined, if and as needed, and/or coated with one or more coatings, such as an environmental barrier coating (EBC) or a thermal barrier coating (TBC).

Turning now to FIGS. 8A, 8B, and 9, other assemblies and methods for forming features in composite components will be described in greater detail. As depicted in FIG. 8A, in an exemplary embodiment of the present subject matter, a base tool 200 comprises a proximal surface 200a opposite a distal surface 200b, as well as one or more recesses 204 defined in the proximal surface 200a. A plurality of composite plies 102 may be laid up on the proximal surface 200a of the base tool 200 such that the one or more recesses 204 help define one or more features of a composite component 90 formed from the plies 102. For example, one recess 204 may be configured for defining a countersink feature 106 in the composite component 90 (FIG. 2) while another recess 204 may be configured for defining a counterbore feature 108 in the composite component 90 (FIG. 2). Other recesses 204 also may be used to define additional and/or different features in the composite component 90, such as one or more features for locating the composite component within an assembly.

A feature forming tool 210 may be brought into contact with the plurality of composite plies 102 that are supported on the base tool 200. The feature forming tool 210 comprises a frame 212 that supports one or more forming members 214 for forming one or more features of the composite component 90. As illustrated in FIG. 8A, the base tool 200 may include one or more alignment features 201 that help align the frame 212 and forming members 214 with the base tool 200 and recesses 204. More particularly, the alignment feature(s) 201 may be a wall that projects away from the base tool 200, and the frame 212 may comprise a lip 211 and a groove 213. When the frame 212 is lowered toward the base tool 200, the lip 211 fits against an outer surface 201a of the alignment feature 201 such that the alignment feature 201 is received in the groove 213. Thus, the frame 212 and base tool 200 may each comprise one or more features for aligning the feature forming tool 210 with the base tool 200. Moreover, as shown in FIG. 8A, the frame 212 may be secured to the base tool 200, e.g., using one or more bolts or screws 215, or the like, to maintain the feature forming tool 210 in position with respect to the base tool 200.

Referring to FIG. 8B, each forming member 214 comprises a shank 216 that extends through the frame 212 and had a first end 216a opposite a second end 216b. The second end 216b is located between the frame 212 and the plurality of composite plies 102 when the feature forming tool 210 is positioned to be brought into contact with the plurality of composite plies 102. In the depicted embodiment, the shank 216 has a length L and a diameter D. Preferably, the ratio of the shank length L to the shank diameter D is large enough to guide the forming member 214 with respect to the composite plies 102. More particularly, the shank length L should be adequate to guide the forming member 214 as the forming member 214 is deployed to press the composite plies 102 into the recess 204.

Further, each forming member 214 comprises a feature forming head 218 at the second end 216b of the shank 216, as well as a biasing member 220 positioned between the frame 212 and the feature forming head 218. The biasing member 220, such as a spring or the like, urges the feature forming head 218 toward the plurality of composite plies 102 to press the plies 102 into the recesses 204. As shown in FIGS. 8A and 8B, the recesses 204 have a shape that is complementary to the shape of the feature forming heads 218 of the forming members 214 such that, together, the recesses 204 and forming members 214 help define the one or more features of the composite component 90.

The first end 216a of the shank 216 extends beyond the frame 212 away from the laid up composite plies 102. A collar 222 encircles or surrounds the shank first end 216a, and a nut or other securing mechanism 226 may be used to hold the collar 222 in place on the shank 216. A wedge 224 may be positioned between the frame 212 and the collar 222, as shown with respect to the leftmost forming member 214 of FIG. 8A. The wedge 224 holds the feature forming head 218 away from the plurality of composite plies 102, e.g., until the feature forming tool 210 is positioned for lowering the feature forming heads 218 against the plies 102. As one example, each wedge 224 holds the feature forming head away from the composite plies 102 until the frame 212 is aligned with the alignment feature(s) 201 of the base tool 200. As illustrated with respect to the other forming members 214 of FIG. 8A and the enlarged forming member 214 of FIG. 8B, each wedge 224 is positioned within a gap G between the collar 222 and the frame 212. The gap G may be sized such that, when the wedge 224 is removed, the feature forming head 218 is urged into contact with the composite plies 102 without applying too much force to the plies 102, i.e., without over-squeezing or compacting the plies 102. That is, the gap G may be sized to allow the feature forming head 218 to displace the composite plies 102 into the recess 204 yet limit the amount of force applies to the plies to avoid otherwise deforming the plies 102. Alternatively or additionally, the biasing member 220 may be selected or sized to avoid biasing feature forming heads 218 into the composite plies 102 with too much force. For example, where biasing member 220 is a spring, a spring may be selected that has a spring rate adequate to displace the composite plies 102 into the recess 204 without otherwise deforming the plies 102.

The forming members 214 may be configured in other ways as well. For example, the shank 216 may be threaded such that the shank 216 is threadingly engaged with the frame 212. By turning or rotating the shank 216 with respect to the frame 212, the shank 216 may move toward or away from the base tool 200 and the composite plies 102 laid up on the base tool 200. It will be appreciated that the shank 216 may be rotated a certain amount to set the feature forming head 218 to a required depth with respect to the plies 102 and the base tool 200 such that the head 218 does not oversqueeze, compact, or apply too much force to the plies 102 as described above. Further, the feature forming head 218 may be attached to the shank 216 such that the head 218 is rotationally free about an axis of the shank 216 that extends along the shank length L. That is, the feature forming head 218 may rotate with respect to the shank 216 such that the feature forming head 218 does not twist or otherwise rotationally displace the composite plies 102 as the shank 216 is rotated to move the head 218 into contact with the plies 102 and urge the plies 102 into the recess 204. Other configurations of and means for displacing the forming members 214 to press the composite plies 102 into the base tool recesses 204 may be used as well.

Referring to FIG. 9, a flow diagram is provided that illustrates a method for forming features in composite components according to an exemplary embodiment of the present subject matter. The exemplary method 900 may be used to form a composite component having one or more formed in features, i.e., features defined in the component without machining the features in the component after processing the composite material 102. As shown at 902 in FIG. 9, the exemplary method 900 includes depositing a composite material 102 on the base tool 200 having recesses 204, e.g., as shown in FIGS. 8A and 8B. In some embodiments, the composite material 102 is in the form of a plurality of composite plies 102, which, as generally described above, may be formed from composite tapes having a composite matrix material embedded within a reinforcement material and may be laid up on the base tool 200. In other embodiments, the composite material 102 is in a form other than composite plies and, for example, may be sprayed or otherwise deposited on the base tool 200.

As illustrated at 904 in FIG. 9, after the composite material 102 is deposited on the base tool 200, one or more apertures 128 may be formed in the composite material 102 as described with respect to FIGS. 5A, 5B, and 6. For instance, an aperture forming tool 132 may be inserted through a tooling aperture (not shown) in the base tool 200 and then driven through the composite material 102 on the base tool 200 and against a stop 136. The aperture forming tool 132 may have a sharp end 134a that forms an aperture 128 in the composite material 102 as the tool is driven through the material. In other embodiments, particularly where the composite material 102 is a plurality of composite plies, the aperture(s) 128 may be cut in each ply 102 before laying up the plies on the base tool 200, such that the aperture(s) 128 in each ply 102 are aligned as the plies 102 are laid up on the base tool 200. Further, as previously described, the centerline $CL_A$ of each aperture 128 may be the same as the centerline $CL_F$ of the respective feature 106, 108, etc. such that the aperture(s) 128 may help align a feature forming tool with the base tool recess(es) 104.

In some embodiments, a bag, similar to the bag 125 shown in FIGS. 3A and 3B, then may be sealed around the composite material 102, as shown at 906 in FIG. 9. That is, the composite material 102 may be bagged for processing, e.g., in an autoclave, as is generally known in the art. For example, bagging the composite material 102 includes enclosing or encasing the material 102 within a vacuum bag, such as a flexible bladder or the like formed from any suitable material. A vacuum may be drawn within the vacuum bag through a vacuum port connected to a vacuum pump, e.g., to remove air and volatiles from the composite material 102. In some embodiments, the bag may be omitted, such that method 900 does not include sealing the bag 125 around the composite material 102 on the base tool 200.

Next, as shown at 908, a feature forming tool 210 is deployed to press the composite material 102 into the base tool recesses 204 to form features of the composite component. More particularly, the feature forming tool 210 is brought into contact with the bag that is sealed around the composite material 102 or, if the bag is omitted, is brought into contact with the composite material 102 on the base tool 200. As described above, the feature forming tool 210 comprises a frame 212 supporting one or more forming members 214 for forming one or more features of the composite component 90. The frame 212 may be aligned with the base tool 200 using the alignment feature(s) 201 of the base tool 200 such that the feature forming head 218 of each forming member 214 can be lowered onto the vacuum bag that is over the composite material 102 or directly onto the composite material 102 to guide the material 102 into the recesses 204 of the base tool 200. The feature forming heads 218 may be lowered, e.g., by removing the wedges 224 that hold the heads 218 away from the composite material 102 such that biasing members 220 urge the heads 218 into contact with the composite material 102, directly or indirectly through the vacuum bag, as described above. In other embodiments, the shank 216 of each forming member 214 may be rotated to lower the feature forming heads 218 and bring the heads 218 into direct or indirect contact with the composite material 102, as previously described in greater detail.

Then, as depicted at 910 in FIG. 9, the plurality of composite material 102 is processed, e.g., compacted and autoclaved or, more generally, debulked and/or processed to reduce porosity, with the feature forming tool 210 pressing the composite material 102 into the base tool recesses 204. The processed composite material forms a green state composite component having the features formed by the interaction between the forming members 214 and the base tool recesses 204. As shown at 912 and 914 in FIG. 9, after processing, the bag (if used) and the feature forming tool 210 are removed from the green state composite component, and then the green state composite component undergoes finish processing to produce the composite component 90 having one or more features, such as a countersink feature 106 and/or a counterbore feature 108. As described above with respect to method 700 illustrated in FIG. 7, finish processing of the green state composite component may include one or more processes that may differ depending on the type of composite material 102 used in the method 900. In one embodiment, where the composite material 102 is a CMC material, finish processing at 914 in FIG. 9 includes firing (or burn-off) of the green state composite component to produce a fired composite component, followed by densification of the fired composite component to produce the composite component. The firing and densification processes may be similar to those described above with respect to method 700. Further, as shown at 916 in FIG. 9, after finish processing the composite component optionally may be finish machined, if and as needed, and/or coated with one or more coatings, such as an environmental barrier coating (EBC) or a thermal barrier coating (TBC).

Turning now to FIGS. 10A through 11F, other assemblies and methods for forming features in composite components will be described in greater detail. As depicted in FIG. 10A, in an exemplary embodiment of the present subject matter and similar to the embodiments illustrated in FIGS. 3, 3A, 3B, 8A, and 8B, a base tool 300 comprises a proximal surface 300a opposite a distal surface 300b, as well as one or more recesses 304 defined in the proximal surface 300a. A plurality of composite plies 102 may be laid up on the proximal surface 300a of the base tool 300 such that the one or more recesses 304 help define one or more features of a composite component 90 formed from the plies 102. For instance, one recess 304 may be configured for defining a countersink feature 106 in the composite component 90 (FIG. 2) while another recess 304 may be configured for defining a counterbore feature 108 in the composite component 90 (FIG. 2). Other recesses 304 also may be used to define additional and/or different features in the composite component 90, such as one or more locating or other features.

A feature forming tool 310 may be brought into contact with the plurality of composite plies 102 that are supported on the base tool 300 by inserting the feature forming tool 310 through an aperture 128 formed in the plies 102 as described above with respect to FIGS. 5A, 5B, and 6. More particularly, the feature forming tool 310 comprises a stem 312 and a feature forming head 314. The stem has a head end 312a opposite a tip end 312b; the feature forming head 314 extends from the head end 312a. The stem 312 and feature forming head 314 may be integrally formed as a single piece feature forming tool 310, or the feature forming head 314 may be attached or coupled to the stem 312. The feature forming head 314 has a shape that is complementary to the shape of the recess 304 of the base tool 300 such that, together, the recess 304 and feature forming head 314 help define the one or more features of the composite component 90.

As illustrated in the exemplary embodiment of FIGS. 10A, 10B, and 10C, the feature forming head 314 includes a cap 315 formed from a first material 316, while the remainder of the feature forming tool 310 is formed from a second material 318. As previously described with respect to first and second materials 116, 118, the second material 318 may be harder than the first material 316. In exemplary embodiments, the first material 316 is silicone, such that the cap 315 is formed from silicone and the remainder of the feature forming head 314 and the stem 312 are formed from a material 318 that is harder than silicone, e.g., a metal, polymer, or elastomer having a greater Shore hardness than silicone. As further illustrated in FIGS. 10A, 10B, and 10C, the cap 315 preferably has a narrow edge 315a defining the largest perimeter of the feature forming head 314. The narrow edge 315a is positioned at a transition area 320 between a portion of the composite plies 102 pressed into the recess 304 by the feature forming head 314 and a portion of the composite plies 102 that are laid up on base tool 300 without being pressed into a recess 304. The relatively softer first material 316 from which the cap 315 is formed may help the composite plies 102 smoothly transition into the recess 304 in the transition area 320, e.g., the cap 315 may help prevent crimping, wrinkling, or the like of the plies 102 around the feature forming tool 310. Further, the narrow edge 315a helps keep the composite plies 102 smooth where a bag is sealed over the plies 102 as described in greater detail below.

Referring particularly to FIG. 10C, the base tool 300 includes a tooling aperture 330 extending from the distal surface 300b of the base tool 300 to the recess 304, similar to the tooling aperture 130 described above with respect to FIGS. 5A, 5B, and 6. More particularly, the tooling aperture 330 extends from a distal end 330b at the base tool distal surface 300b to a proximal end 330a at the recess 304, and the tooling aperture 330 has a centerline $CL_T$. As shown in FIG. 10C, the feature forming tool 310 is centered along the tooling aperture centerline $CL_T$ and the aperture centerline $CL_A$ such that the feature centerline $CL_F$ is co-extensive with or aligned along the tooling aperture and composite aperture centerlines $CL_T$, $CL_A$. It will be appreciated that the tooling aperture 330 in base tool 300 may be used to form an aperture 128 substantially in the center of the feature to be formed by the recess 304 and the feature forming tool 310. Moreover, as described above, where the centerline $CL_A$ of each aperture 128 is substantially the same as the centerline $CL_F$ of the respective feature 106, 108, etc., the aperture(s) 128 may help align the feature forming tool 310 with the base tool recess(es) 304.

Further, in some embodiments of the present subject matter, a seal 322, such as an O-ring or the like, is positioned in the tooling aperture 330 adjacent the recess 304, e.g., to provide a seal around the stem 312 of the feature forming tool 310. More specifically, in some embodiments, the pre-preg composite plies 102 may be at least partially wet, e.g., the slurry composition impregnating the fibers may be at least partially liquid or fluidic. As such, the slurry may tend to flow into the tooling aperture 330, particularly when the feature forming tool 310 is brought into contact with the composite plies 102 to press the plies into the recess 304. The seal 322 helps prevent the slurry or other constituents of the pre-preg from oozing, running, dripping, or otherwise traveling into the tooling aperture 330 as the feature forming tool 310 presses the composite plies 102 into the recess 304.

FIGS. 11A through 11F illustrate another assembly for forming features in a composite component according to an exemplary embodiment of the present subject matter. As shown in FIG. 11A, a plurality of composite plies 102 may be laid up on a proximal side 300a of base tool 300 as described with respect to FIGS. 10A, 10B, and 10C. The base tool 300 comprises a recess 304, as well as a tooling aperture 330 that extends from a proximal end 330a at the recess 304 to a distal end 330b at the base tool distal surface 300b. The composite plies 102 are laid up on the base tool 300 such that the plies 102 overlay the recess 304.

As depicted in FIG. 11B, an aperture forming tool 332 may be used to form an aperture 128 in the composite plies 102 supported on the base tool 300. More particularly, the aperture forming tool 332 may be an awl or the like that is inserted into the distal end 330b of the tooling aperture 330. A sharp end 332a of the tool 332 pierces the plurality of composite plies 102 as the aperture forming tool 332 is inserted through the tooling aperture 330, and a shaft 334 of the tool 332 forms the aperture 128 as the tool shaft 334 is inserted through the plies 102. A handle end 332b of the tool 332, opposite the sharp end 332a, provides an area to grip the aperture forming tool 332 for manipulation, e.g., insertion into and through the tooling aperture 330 and into the plurality of composite plies 102.

Referring to FIG. 11C, in the depicted embodiment, the sharp end 332a of the aperture forming tool 332 is removable. As such, after the sharp end 332a pierces the composite plies 102 and the shaft 334 is inserted through the plies 102 to form the aperture 128 in the plies, the sharp end 332a is removed while the shaft 334 of the aperture forming tool 332 remains in contact with the plies 102. Then, as shown in FIG. 11D, the feature forming tool 310 is attached to the shaft 334 of the tool 332. That is, the tip end 312b of the feature forming tool stem 312 is configured to be attached to the shaft 334 of the aperture forming tool 332. The aperture forming tool 332 then is retracted or drawn back through the tooling aperture 330 to move the feature forming tool 310 into contact with the plurality of composite plies 102. In particular, the stem 312 of the feature forming tool 310 is guided into the tooling aperture 330 in the base tool 300, and the feature forming head 314 guides the composite plies 102 into the recess 304 until the plies 102 and the head 314 are seated within the recess 304. It will be appreciated that the feature forming head 314 may be configured as described above with respect to FIGS. 10A, 10B, and 10C, e.g., the feature forming head 314 may comprise a cap 315 formed from a first material 316 and having a narrow edge 315a while the remainder of the head 314 is formed from a second material 318.

Once the plurality of composite plies 102 are guided into the recess 304 such that the plies 102 are trapped between the base tool 300 and the feature forming tool 310, the aperture forming tool 332 is detached. As shown in FIG. 11E, the feature forming tool 310 remains in contact with the composite plies 102 after the aperture forming tool 332 is detached from the feature forming tool 310. Finally, in some embodiments, a bag 125 may be sealed around the composite plies 102 with the feature forming tool 310 in contact with the plies 102 as illustrated in FIG. 11F. The plurality of composite plies 102 and the feature forming tool 310 may then be processed as described in greater detail below.

Using the aperture forming tool 332 to guide the feature forming tool 310 into contact with the plurality of composite plies 102 may be helpful in some embodiments of the present subject matter. For instance, as described above, the composite plies 102 generally may be wet or sticky, e.g., due to the slurry used to form prepreg plies, which may make it difficult to guide the feature forming tool 310 through the aperture 128 in the plies 102 and into the tooling aperture 330. Accordingly, attaching the feature forming tool 310 to the aperture forming tool 332 that is already positioned within the aperture 128 and the tooling aperture 330 can simplify guiding the feature forming tool 310 into position with respect to the plies 102 and the base tool 300. However, in other embodiments, the sharp end 332a of the aperture forming tool 332 may not be removable. In such embodiments, the aperture forming tool 332 may be used to form the aperture 128 in the composite plies 102, as generally described above, and then the tool 332 may be removed from the plies 102 and base tool 300, e.g., by retracting the tool 332 through the tooling aperture 330. Next, the feature forming tool 310, without being attached to the aperture forming tool 332, may be inserted through the composite plies 102 and into the base tool 300 until the feature forming head 314 guides the plies 102 into the base tool recess 304 to seat the plies 102 and head 314 in the recess 304. The assembly, i.e., the tool 310 and plies 102, then may be bagged and/or processed as described in greater detail below.

Turning to FIG. 12, a flow diagram is provided that illustrates a method for forming features in composite components according to an exemplary embodiment of the present subject matter. The exemplary method 1200 may be used to form a composite component having one or more formed in features, i.e., features defined in the component without machining the features in the component after processing the composite material 102. As shown at 1202 in FIG. 12, the exemplary method 1200 includes depositing a composite material 102 on the base tool 300 having recesses 304, e.g., as shown in FIGS. 10A through 11F. In some embodiments, the composite material 102 is in the form of a plurality of composite plies 102, which, as generally described above, may be formed from composite tapes having a composite matrix material embedded within a reinforcement material and may be laid up on the base tool 300. In other embodiments, the composite material 102 is in a form other than composite plies and, for example, may be sprayed or otherwise deposited on the base tool 300.

As illustrated at 1204 in FIG. 12, after the composite material 102 is deposited on the base tool 300, one or more apertures 128 may be formed in the composite material 102. In one embodiment of method 1200, the apertures 128 may be formed as described with respect to FIGS. 5A, 5B, and 6. For instance, an aperture forming tool 132 may be aligned with a tooling aperture 330 in the base tool 300, inserted into the tooling aperture 330 through the distal end 330b, and then driven through the composite material 102 on the base tool 300. The aperture forming tool 132 may have a sharp end 134a that forms an aperture 128 in the composite material 102 as the tool is driven through the material. Finally, the tool 132 is removed from the composite material 102, leaving the aperture 128 in the material 102. In other embodiments, particularly where the composite material 102 is a plurality of composite plies, the aperture(s) 128 may be cut in each ply 102 before laying up the plies on the base tool 300, such that the aperture(s) 128 in each ply 102 are aligned as the plies 102 are laid up on the base tool 300. Further, as previously described, the centerline $CL_A$ of each aperture 128 may be the same as the centerline $CL_F$ of the respective feature 106, 108, etc. such that the aperture(s) 128 may help align a feature forming tool with the base tool recess(es) 304.

Next, as shown at 1206 in FIG. 12, a feature forming tool 310 is deployed to press the composite material 102 into the base tool recesses 304 to form features of the composite component. More particularly, as shown in FIGS. 10A, 10B, and 10C, a tip end 312b of a stem 312 of the feature forming tool 310 is inserted into the aperture 128 formed in the composite material 102 such that the stem 312 is inserted through the composite material 102 and into the tooling aperture 330 of the base tool 300. The stem 312 thereby aligns the feature forming head 314 of the tool 310 with the base tool recess 304. As such, as the stem 312 is drawn through the tooling aperture 330 and the feature forming head 314 is brought into contact with the composite material 102, the feature forming head 314 guides and presses the composite material 102 into the recess 304. The stem 312 may be drawn into the tooling aperture 330 until the edge 315a of the feature forming head cap 315 contacts an outermost surface 102a of the composite material 102 supported on the base tool 300. An innermost surface 102b of the composite material 102 contacts the proximal surface 300a of the base tool 300.

In other embodiments of method 1200, the apertures 128 may be formed and the feature forming tool 310 brought into contact with the composite material 102 as described with respect to FIGS. 11A through 11F. For example, to form an aperture 128 in the composite material 102 on the base tool 300 as shown at 1204 in FIG. 12, an aperture forming tool 332 having a removable sharp end 332a is aligned with the tooling aperture 330 in base tool 300. The tool 332 is inserted into the tooling aperture 330 through distal end 330b until the aperture forming tool sharp end 332a pierces through the composite material 102 and a shaft 334 of the tool 332 forms the aperture 128. Then, the sharp end 332a is removed from the shaft 334 and the feature forming tool 310 is attached to the shaft 334 of the aperture forming tool 332. Next, as shown at 1206 in FIG. 12, the aperture forming tool 332 is drawn back through the tooling aperture 330 to deploy the feature forming tool 310 to press the composite material 102 into the base tool recesses 304 to form features of the composite component. Once the composite material 102 and the feature forming head 314 are seated within the recess 304 as shown in FIG. 11E, the aperture forming tool 332 is detached from the feature forming tool 310, with the edge 315a of the feature forming head cap 315 contacting an outermost surface 102a of the composite material 102, which has an innermost surface 102b in contact with the proximal surface 300a of the base tool 300.

As shown at 1208 in FIG. 12, in some embodiments of method 1200, a bag 125 may be sealed around the composite material 102 with the feature forming tool 310 in contact with the composite material, as illustrated in FIGS. 10B and 11F. That is, the composite material 102 may be bagged for processing with the feature forming tool 310 in contact with the material 102. For example, bagging the composite material 102 includes enclosing or encasing the material 102 and feature forming tool 310 within a vacuum bag, such as a flexible bladder or the like formed from any suitable material. A vacuum may be drawn within the vacuum bag through a vacuum port connected to a vacuum pump, e.g., to remove air and volatiles from the composite material 102. In some embodiments, the bag may be omitted, such that method 1200 does not include sealing the bag 125 around the composite material 102 on the base tool 300 with the feature forming tool 310 in contact with the composite material.

Then, as depicted at 1210 in FIG. 12, the composite material 102 is processed, e.g., compacted and autoclaved or, more generally, debulked and/or processed to reduce porosity, with the feature forming tool 310 pressing the composite material 102 into the base tool recess 304. The processed composite material forms a green state composite component having the features formed by the interaction between the feature forming head 314 and the base tool recess 304. As shown at 1212 and 1214 in FIG. 12, after processing, the bag (if used) and the feature forming tool 310 are removed from the green state composite component, and then the green state composite component undergoes finish processing to produce the composite component 90 having one or more features, such as a countersink feature 106 and/or a counterbore feature 108. As described above with respect to method 700 illustrated in FIG. 7, finish processing of the green state composite component may include one or more processes that may differ depending on the type of composite material 102 used in the method 1200. In one embodiment, where the composite material 102 is a CMC material, finish processing at 1214 in FIG. 12 includes firing (or burn-off) of the green state composite component to produce a fired composite component, followed by densification of the fired composite component to produce the composite component. The firing and densification processes may be similar to those described above with respect to method 700. Further, as shown at 1216 in FIG. 12, after finish processing the composite component optionally may be finish machined, if and as needed, and/or coated with one or more coatings, such as an environmental barrier coating (EBC) or a thermal barrier coating (TBC).

Referring now to FIG. 13, in some embodiments, a tooling assembly is used with the base tool to support a part to be embedded into the composite material. For instance, as illustrated in FIG. 13, a base tool 400 comprises a proximal surface 400a opposite a distal surface 400b, and a plurality of composite plies 102 may be laid up on the proximal surface 400a of the base tool 400. An aperture 128 may be formed in the composite plies 102 supported on the base tool 400, e.g., as described above with respect to FIGS. 5A, 5B, and 6.

Further, a feature forming tool 410 may be brought into contact with the plurality of composite plies 102 that are supported on the base tool 400. More particularly, a tooling assembly 412 is attached to the base tool 400 such that a pin 414 may be inserted into the aperture 128 and maintained in contact with the composite plies 102, i.e., the tooling assembly 412 prevents the pin 414 from dropping through the base tool 400. In some embodiments, the pin 414 is configured to be embedded in the composite component 90, e.g., the pin 414 may be formed from a material that integrates with the composite material as the composite material is transformed into the composite component 90. For instance, where the composite plies 102 are CMC plies 102, the pin 414 may be formed from a ceramic material such that the ceramic pin 414 is embedded in the composite component 90. Where the composite material 102 is a PMC material 102, the pin 414 may be formed from a metallic material, such as a metal or metal alloy. In other embodiments, the pin 414 is configured to be removed after processing of the composite material, such that the pin 414 is not embedded in the composite component 90 but is used to form a void feature, such as an aperture 128, in the component 90.

The tooling assembly 412 comprises a shoulder bushing 416 positioned in a passage 418 in the base tool 400. The shoulder bushing 416 has a first end 416a opposite a second end 416b and defines an opening 420 therethrough. The first end 416a is adjacent the plurality of composite plies 102 laid up on the base tool 400, and the second end 416b extends through the base tool 400 and defines a shoulder 422 that rests on a boss 424 of the base tool 400. The boss 424 extends from the base tool distal surface 400b. In the exemplary embodiment of FIG. 13, the boss 424 is threaded, and a nut 425 is threaded onto the boss 424 to hold the shoulder 422 of the shoulder bushing 416 against the boss 424. However, the shoulder bushing 416 may be secured to the base tool 400 in other ways as well, e.g., another securing mechanism 425 than a nut may be used to secure the shoulder bushing 416 to the base tool 400. Moreover, an end cap 426 is secured to the second end 416b of the shoulder bushing 416 to cover and/or plug the opening 420 at the second end 416b. As shown in the depicted exemplary embodiment, the end cap 426 may be threaded to a threaded projection 428 extending from the shoulder bushing second end 416b, but the end cap 426 may have other configurations or may be otherwise secured to the shoulder bushing 416. It will be appreciated that the pin 414 may be inserted through the aperture 128 in the composite plies 102 and into the shoulder bushing opening 420 after the end cap 426 is secured in place at the second end 416b of the shoulder bushing 416 such that the end cap 426 prevents the pin 414 from dropping through the opening 420 at the second end 416b and out of contact with the plies 102.

The tooling assembly 412 and pin 414 configuration may be particularly useful where the composite component 90 comprises several pins 414 that extend along different vectors. For instance, the base tool 400 may comprise several passages 418, e.g., two or more passages 418, that each receive a tooling assembly 412 and a pin 414 such that several pins 414 may be embedded in the composite component 90 formed from a plurality of composite plies 102 laid up on the base tool 400. In some embodiments, one passage 418 and the pin 414 positioned therein may be aligned along a different vector than another passage 418 and pin 414, and in other embodiments, each passage 418 and its respective pin 414 may be aligned along a different vector than the other passages 418 and pins 414 of the base tool 400 and lay up. The differing orientations of the pins 414 could make it difficult to remove the composite component from the base tool 400. However, the tooling assembly 412 permits the shoulder bushings 416 to be removed from the passages 418, e.g., by removing the nuts or securing mechanisms 425 holding the shoulder bushings 416 to the base tool 400, to expose larger openings (the passages 418) for the pins 414 to move within as the composite component is removed from the base tool 400. The larger openings of the passages 418 allow the pins 414 a greater range of movement with respect to the base tool 400 such that a composite component having a more complicated pin arrangement, e.g., pins 414 extending along several different vectors, can be removed from the base tool 400.

As further illustrated in FIG. 13, the feature forming tool 410 comprises a thin disk, such that bringing the feature forming tool 410 into contact with the plurality of composite plies 102 comprises placing the disk 410 over the pin 414 and against the plurality of composite plies 102. Similar to the feature forming head 314 described with respect to FIGS. 10A, 10B, and 10C, the thin, disk-shaped feature forming tool 410 may comprise an edge portion 410a formed from a first material 428 and a body portion 410b formed from a second material 430. As previously described with respect to first and second materials 116, 118, the second material 430 may be harder than the first material 428. In exemplary embodiments, the first material 428 is silicone, such that the edge portion 410a is formed from silicone and the remainder of the feature forming tool 410 (i.e., body portion 410b) is formed from a material 430 that is harder than silicone, e.g., a metal, polymer, or elastomer having a greater Shore hardness than silicone. As further illustrated in FIG. 13, the edge portion 410a preferably is relatively narrow or thin and defines the largest perimeter of the feature forming tool 410. The narrow edge portion 410a helps form a transition area 429 between the composite plies 102 and the bag 125 sealed around the plies 102 and the tool 410 as further described below. The relatively softer first material 428 from which the edge portion 410a is formed may help prevent crimping, wrinkling, or the like of the composite plies 102 around the feature forming tool 410, keeping the composite plies 102 smooth where the bag 125 is sealed over the plies 102.

Turning to FIG. 14, in other embodiments of the present subject matter, the tooling assembly 412 may comprise different configurations. For example, in the embodiment depicted in FIG. 14, the tooling assembly 412 is configured for receipt of a removable feature forming tool 410 rather than a pin 414 to be embedded in the composite component 90. The illustrated tooling assembly 412 comprises a female die 432 that defines a recess 404, similar to the recesses 104, 204, 304 defined in the base tools 100, 200, 300 described above, and defines an opening 434 therethrough. As such, the female die 432 is shaped complementary to the feature forming tool 410, which forms a male die with a feature forming head 436 shaped complementary to the recess 404 and a stem 438 that extends into the opening 434 in female die 432 when the feature forming tool 410 is positioned in the tooling assembly 412. It will be appreciated that, similar to the shoulder bushing 416 described with respect to FIG. 14, the female die 432 may be positioned within a passage 418 defined in the base tool 400, although the passage 418 that receives a female die 432 may have a different size and/or cross-sectional shape than the passage 418 that receives a shoulder bushing 416. Further, as illustrated in FIG. 14, a seal 440, such as an O-ring or the like, is received in a groove 442 defined in the female die 432 to provide a seal between the female die 432 and the base tool 400, e.g., to help prevent slurry from the prepreg composite plies from passing through the passage 418 in the base tool 400.

The tooling assembly 412 also includes a nut 444 that threadingly engages the female die 432 adjacent the distal surface 400b of the base tool 400 to hold the female die 432 within the base tool 400. In other embodiments, a securing mechanism 444 other than a nut may be used to hold the female die 432 in place with respect to the base tool 400. Moreover, the tooling assembly 412 includes a sleeve 446 that is received in a distal portion 434b of the opening 434 through the female die 432. As shown in FIG. 14, a proximal portion 434a of the opening 434 is sized such that the opening 434 closely surrounds the stem 438 of the feature forming tool 410. The distal portion 434b is sized to receive the sleeve 446, which defines an opening 448 therein through which the stem 438 passes. A seal 450, such as an O-ring or the like, is positioned between a proximal end 446a of the sleeve 446 and the female die 432, e.g., to provide a seal around the stem 438 of the feature forming tool 410. A nut 452 threadingly engages the female die 432 to capture and maintain the sleeve 446 within the distal portion 434b of the die opening 434. Of course, in other embodiments, a securing mechanism 452 other than a nut may be used to secure the sleeve within the opening 434.

It will be understood that the feature forming head 436 of the feature forming tool 410 shown in FIG. 14 guides and presses the composite material 102 into the recess 404 similar to the feature forming head 314 described with respect to FIGS. 10A through 11F. Further, like feature forming head 314, the feature forming head 436 of FIG. 14 may comprise a cap and/or edge formed from a first material, such as silicone, while the remainder of the head 436 is formed from a second material having a greater Shore hardness than the first material. In other embodiments, the feature forming head 436 may be formed entirely from the first material or the second, harder material. However, the first, softer material may be preferable, at least around the edge of the feature forming head where the composite plies 102 transition into the recess 404, e.g., to prevent crimping, wrinkling, or the like of the plies 102 around the feature forming tool 410 and/or to help keep the plies 102 smooth where a bag is sealed over the plies 102 as described in greater detail below.

FIG. 15 provides a flow diagram illustrating a method for forming features in composite components according to an exemplary embodiment of the present subject matter. The exemplary method 1500 may be used to form a composite component having one or more formed in features, i.e., features defined in the component without machining the features in the component after processing the composite material 102. As shown at 1502 in FIG. 15, the exemplary method 1500 comprises assembling a tooling assembly 412 with a base tool 400, as described with respect to FIGS. 13 and 14. In some embodiments, as depicted in FIG. 13, the tooling assembly 412 is assembled with the base tool 400 by inserting a shoulder bushing 416 into a passage 418 defined in the base tool 400. Then, a nut or other securing mechanism 425 is used to secure the shoulder bushing 416 to the base tool 400. For example, a nut 425 is threaded onto a threaded boss 424 defined by the base tool 400 to trap a shoulder 422 of the shoulder bushing 416 between the nut 425 and the boss 424 and thereby secure the shoulder bushing 416 to the base tool 400. Next, an end cap 426 is secured at the second end 416b of the shoulder bushing 416 to cover or stop up an opening in the shoulder bushing 416 at its second end 416b.

In other embodiments, as illustrated in FIG. 14, the tooling assembly 412 is assembled with the base tool 400 by inserting a female die 432 into the passage 418 defined in the base tool 400. A nut or other securing mechanism 444 secures the female die 432 to the base tool 400. Then, a sleeve 446, which defines an opening 448 therethrough, is inserted into a distal portion 434b of an opening 434 through the female die 432. A nut or other securing mechanism 452 secures the sleeve 446 within the opening 434 in the female die 432. One or more seals 440, 450, such as O-ring seals or the like, may be used between the female die 432 and the base tool 400 and/or between the sleeve 446 and the female die 432.

As depicted at 1504 in FIG. 15, the exemplary method 1500 also includes depositing a composite material 102 on the base tool 400 and tooling assembly 412, e.g., as shown in FIGS. 13 and 14. In some embodiments, the composite material 102 is in the form of a plurality of composite plies 102, which, as generally described above, may be formed from composite tapes having a composite matrix material embedded within a reinforcement material and may be laid up on the base tool 400. In other embodiments, the composite material 102 is in a form other than composite plies and, for example, may be sprayed or otherwise deposited on the base tool 400.

As illustrated at 1506 in FIG. 15, after the composite material 102 is deposited on the base tool 400, one or more apertures 128 may be formed in the composite material 102. In one embodiment of method 1500, the apertures 128 may be formed as described with respect to FIGS. 5A, 5B, and 6. For instance, referring to FIG. 13, an aperture forming tool 132 may be aligned with the opening 420 through the shoulder bushing 416 and then driven through the composite material 102 on the base tool 400. The aperture forming tool 132 may have a sharp end 134a that forms an aperture 128 in the composite material 102 as the tool is driven through the material. Finally, the tool 132 is removed from the composite material 102, leaving the aperture 128 in the material 102. In other embodiments, the aperture forming tool 132 may be used to form the aperture 128 before the end cap 426 is positioned on the second end 416b of the shoulder bushing 416. For example, the aperture forming tool 132 may be aligned with the opening 420, inserted through the opening 420 at the second end 416b of the shoulder bushing 416, and driven through the composite material 102 and against a stop 136 to form an aperture 128 as described with respect to FIGS. 5A and 5B. In still other embodiments, a guide tool 144 may be used to form the aperture 128 as described with respect to FIG. 6. After the aperture 128 is formed in the composite material 102, the end cap 426 may be secured to the shoulder bushing 416 as described above. Further, it will be appreciated that the aperture 128 also may be formed as described with respect to FIGS. 11A through 11F, and for the embodiment shown in FIG. 14, an aperture 128 may be formed in the composite material 102 as described with respect to FIG. 5A, 5B, 6, or 11A through 11F. In yet other embodiments, particularly where the composite material 102 is a plurality of composite plies, the aperture(s) 128 may be cut in each ply 102 before laying up the plies on the base tool 400, such that the aperture(s) 128 in each ply 102 are aligned as the plies 102 are laid up on the base tool 400. Moreover, as previously described, the centerline $CL_A$ of each aperture 128 may be the same as the centerline $CL_F$ of the respective feature 106, 108, etc. such that the aperture(s) 128 may help align a feature forming tool with the base tool recess(es) 104.

Next, as shown at 1508 in FIG. 15, a feature forming tool 410 is deployed to press a pin 414 in place, as described with respect to FIG. 13, or to press the composite material 102 into the recess 404, as described with respect to FIG. 14, and thereby form one or more features of the composite component. More particularly, as shown in the exemplary embodiment of FIG. 13, deploying the feature forming tool 410 comprises inserting a pin 414 through the aperture 128 in the composite material 102 and into the opening 420 in the shoulder bushing 416 and then placing a generally disk-shaped feature forming tool 410 over the pin 414. Alternatively, as shown in the exemplary embodiment of FIG. 14, deploying the feature forming tool 410 comprises inserting a stem 438 of the feature forming tool 410 into the aperture 128 formed in the composite material 102 such that the stem 438 is inserted through the material 102 and into the opening 434 in the female die 432. The stem 438 thereby aligns the feature forming head 436 of the tool 410 with the recess 404 defined in the female die 432. As such, as the stem 438 advances through the opening 434 and the feature forming head 436 is brought into contact with the composite material 102, the feature forming head 436 guides and presses the composite material 102 into the recess 404. The stem 438 may be drawn into the opening 434 until an edge of the feature forming head 436 contacts an outermost surface 102a of the composite material 102 supported on the base tool 400. An innermost surface 102b of the composite material 102 contacts the proximal surface 400a of the base tool 400.

As shown at 1510 in FIG. 15, in some embodiments of method 1500, a bag 125 may be sealed around the composite material 102 with the feature forming tool 410 in contact with the composite material, as illustrated in FIGS. 13 and 14. That is, the composite material 102 may be bagged for processing with the feature forming tool 410 in contact with the material 102. For example, bagging the composite material 102 includes enclosing or encasing the material 102 and feature forming tool 410 within a vacuum bag, such as a flexible bladder or the like formed from any suitable material. A vacuum may be drawn within the vacuum bag through a vacuum port connected to a vacuum pump, e.g., to remove air and volatiles from the composite material 102. In some embodiments, the bag may be omitted, such that method 1500 does not include sealing the bag 125 around the composite material 102 on the base tool 400 with the feature forming tool 410 in contact with the composite material.

Then, as depicted at 1512 in FIG. 15, the composite material 102 is processed, e.g., compacted and autoclaved or, more generally, debulked and/or processed to reduce porosity, with the feature forming tool 410 in contact with the composite material 102. The processed composite material forms a green state composite component having the features formed by, e.g., the pin 414 embedded therein or the interaction between the feature forming head 436 and the recess 404. As shown at 1514 and 1516 in FIG. 15, after processing, the bag (if used) and the feature forming tool 410 are removed from the green state composite component, and then the green state composite component undergoes finish processing to produce the composite component 90 having one or more features, such as an embedded pin 414, a countersink feature 106, and/or a counterbore feature 108. As described above with respect to method 700 illustrated in FIG. 7, finish processing of the green state composite component may include one or more processes that may differ depending on the type of composite material 102 used in the method 1500. In one embodiment, where the composite material 102 is a CMC material, finish processing at 1516 in FIG. 15 includes firing (or burn-off) of the green state composite component to produce a fired composite component, followed by densification of the fired composite component to produce the composite component. The firing and densification processes may be similar to those described above with respect to method 700. Further, as shown at 1518 in FIG. 15, after finish processing the composite component optionally may be finish machined, if and as needed, and/or coated with one or more coatings, such as an environmental barrier coating (EBC) or a thermal barrier coating (TBC).

FIGS. 16A and 16B illustrate other tooling assemblies that may be used to form one or more features in a composite component. In the depicted embodiments, the tooling assembly 500 includes a main tool 502 and a segmented tool 504 that comprises two or more segments. A first segment 504a is shown in FIGS. 16A and 16B, but it will be appreciated that the segmented tool 504 also includes a second segment and may also include additional segments, e.g., a third, fourth, fifth segment and so on. As illustrated in FIGS. 16A and 16B, the tooling assembly 500 may be used to form axisymmetric composite components having an axial centerline $ACL_C$. As such, features formed in the composite component that extend away from the centerline $ACL_C$ may hinder removal of the component from a tool or mold on which the composite material is supported. To facilitate removal from a supporting tool or mold of an axisymmetric composite component having features formed therein, the tooling assembly 500 includes the segmented tool 504 that is received within the main tool 502. More particularly, the segmented tool 504 fits within the main tool 502 in the one or more areas in which features are to be formed in the composite component. For example, the segmented tool 504 surrounds an area of the composite material where a countersink 106, counterbore 108, or other feature and/or aperture 128 are to be formed, as shown in FIG. 16A, or where a pin 414 is to be embedded in the composite component, as shown in FIG. 16B. The number of segments in the segmented tool 504 depends on the number and angular spacing of the apertures 128 in the composite material 102, in which a feature forming tool or a pin 414 are received, as well as the draft angle of any countersink or counterbore features 106, 108.

When the segments of the segmented tool 504 are positioned within the main tool 502, the main tool 502 and the segmented tool 504 define a tooling surface 506. Further, one or more seals 508, such as O-rings or the like, may be positioned between the segments of the segmented tool 504 and the main tool 502. Moreover, a composite material 102 may be deposited on the tooling surface 106, e.g., a plurality of composite plies 102 may be laid up on the tooling surface 506 or the composite material 102 may be otherwise deposited on the tooling surface 506, such as through spraying or the like. The first segment 504a of segmented tool 504 defines a tooling aperture 509, into which an aperture forming tool may be inserted to form the aperture 128 in the composite material 102. The aperture forming tool may be similar to the tool 132 described with respect to FIGS. 5B and 6 or the tool 332 described with respect to FIGS. 11B, 11C, and 11D; the aperture forming tool may have other configurations as well.

A feature forming tool 510 may be brought into contact with the plurality of composite plies 102 supported on the tooling assembly 500. Referring to FIG. 16A, the feature forming tool 510 may be configured substantially similar to the feature forming tool 310 described with respect to FIGS. 10A through 11F or the feature forming tool 410 described with respect to FIG. 14. More particularly, as shown in FIG. 16A, the feature forming tool 510 comprises a stem 512 and a feature forming head 514. The stem 512 extends through the aperture 128 formed in the composite plies 102 and into the tooling aperture 509 defined in the first segment 504a of segmented tool 504. The feature forming head 514 guides and presses the composite plies 102 into a recess 516 defined in the first segment 504a. One or more seals 518, such as O-ring seals or the like, may be positioned between the feature forming tool stem 512 and the first segment 504a, e.g., to provide a seal between the stem 512 and the segmented tool 504 if required. Further, like feature forming head 314 of feature forming tool 310, the feature forming head 514 of FIG. 16A may comprise a cap and/or edge formed from a first material, such as silicone, while the remainder of the head 514 is formed from a second material having a greater Shore hardness than the first material. In other embodiments, the feature forming head 514 may be formed entirely from the first material or the second, harder material. However, the first, softer material may be preferable, at least around the edge of the feature forming head where the composite plies 102 transition into the recess 516, e.g., to prevent crimping, wrinkling, or the like of the plies 102 around the feature forming tool 510 and/or to help keep the plies 102 smooth where a bag is sealed over the plies 102 as described in greater detail below.

In the embodiment depicted in FIG. 16B, the feature forming tool 510 is positioned over a pin 414 similar to the embodiment described with respect to FIG. 13. More specifically, a pin 414 may be inserted into the aperture 128 and maintained in contact with the composite plies 102, i.e., the feature forming tool 510 prevents the pin 414 from falling back through the aperture 128. As described with respect to FIG. 13, in some embodiments, the pin 414 is configured to be embedded in the composite component 90, e.g., the pin 414 may be formed from a material that integrates with the composite material as the composite material is transformed into the composite component 90. For instance, where the composite plies 102 are CMC plies 102, the pin 414 may be formed from a ceramic material such that the ceramic pin 414 is embedded in the composite component 90. Where the composite material 102 is a PMC material 102, the pin 414 may be formed from a metallic material, such as a metal or metal alloy. In other embodiments, the pin 414 is configured to be removed after processing of the composite material, such that the pin 414 is not embedded in the composite component 90 but is used to form a void feature, such as an aperture 128, in the component 90.

Continuing with FIG. 16B, the feature forming tool 510 comprises a disk substantially similar in shape to the feature forming head 514 of the tool 510 illustrated in FIG. 16A. Bringing the feature forming tool 510 of FIG. 16B into contact with the plurality of composite plies 102 comprises placing the disk 510 over the pin 414 and against the plurality of composite plies 102. The disk 510 guides and presses the plies 102 into the recess 516 of the first segment 504a as the disk 510 is seated into the recess. Further, similar to the feature forming head 314 of feature forming tool 310 and the feature forming head 514 of FIG. 16A, the disk 510 may comprise a cap and/or edge formed from a first material, such as silicone, while the remainder of the disk 510 is formed from a second material having a greater Shore hardness than the first material. In other embodiments, the disk 510 may be formed entirely from the first material or the second, harder material. However, the first, softer material may be preferable, at least around the edge of the feature forming head where the composite plies 102 transition into the recess 516, e.g., to prevent crimping, wrinkling, or the like of the plies 102 around the feature forming tool 510 and/or to help keep the plies 102 smooth where a bag is sealed over the plies 102 as described herein.

FIG. 17 provides a flow diagram illustrating a method for forming features in composite components according to another exemplary embodiment of the present subject matter. The exemplary method 1700 may be used to form a composite component having one or more formed in features, i.e., features defined in the component without machining the features in the component after processing the composite material 102. As described with respect to FIGS. 16A and 16B, in some embodiments, a tooling assembly 500 comprising a main tool 502 and a segmented tool 504 may be used to support a composite material to be formed into a composite component having one or more features defined therein. As shown at 1702 in FIG. 17, in an exemplary method 1700 utilizing the tooling assembly 500, the two or more segments of the segmented tool 504 must first be installed within the main tool 502. The two or more segments of the segmented tool 504 define one or more recesses 516 for forming features in the composite component; for example, as illustrated in FIGS. 16A and 16B, a first segment 504a defines a recess 516 for forming a counterbore feature 108 in the composite component 90.

After the tooling assembly 500 is assembled, a composite material 102 is deposited on the tooling assembly 500 having recesses 516, as shown at 1704 in FIG. 17. In some embodiments, the composite material 102 is in the form of a plurality of composite plies 102, which, as generally described above, may be formed from composite tapes having a composite matrix material embedded within a reinforcement material and may be laid up on the tooling assembly 500. In other embodiments, the composite material 102 is in a form other than composite plies and, for example, may be sprayed or otherwise deposited on the tooling assembly 500.

After the composite material 102 is deposited on the tooling assembly 500, as illustrated at 1706 in FIG. 17, one or more apertures 128 may be formed in the composite material 102. In one embodiment of method 1700, the apertures 128 may be formed with an aperture forming tool 132 described with respect to FIGS. 5A, 5B, and 6. For instance, the aperture forming tool 132 may be aligned with a tooling aperture 509 in the segmented tool 504 and driven through the composite material 102 supported on the tooling assembly 500 and into the tooling aperture 509. The aperture forming tool 132 may have a sharp end 134a that forms an aperture 128 in the composite material 102 as the tool is driven through the material. Finally, the tool 132 is removed from the composite material 102, leaving the aperture 128 in the material 102. In alternative embodiments, the aperture 128 may be formed using an aperture forming tool 332 described with respect to FIGS. 11A through 11F. Other aperture forming tools and ways of forming the one or more apertures 128 may be used as well. For example, particularly where the composite material 102 is a plurality of composite plies, the aperture(s) 128 may be cut in each ply 102 before laying up the plies on the tooling assembly 500, such that the aperture(s) 128 in each ply 102 are aligned as the plies 102 are laid up on the tooling assembly 500. Further, as previously described, the centerline $CL_A$ of each aperture 128 may be the same as the centerline $CL_F$ of the respective feature 106, 108, etc. such that the aperture(s) 128 may help align a feature forming tool with the recess(es) 516.

Next, as shown at 1708 in FIG. 17, a feature forming tool 510 is deployed to press the composite material 102 into the recess(es) 516 to form features of the composite component. In one embodiment, as described with respect to FIG. 16A, a stem 512 of the feature forming tool 510 is inserted into the aperture 128 formed in the composite material 102 such that the stem 512 is inserted through the material 102 and into the tooling aperture 509 of the first segment 504a. The stem 512 thereby aligns the feature forming head 514 of the tool 510 with the recess 516. As such, as the stem 512 is advanced into the tooling aperture 509 and the feature forming head 514 is brought into contact with the plurality of composite material 102, the feature forming head 514 guides and presses the composite material 102 into the recess 516. The stem 512 may be advanced into the tooling aperture 509 until an edge of the feature forming head 514 contacts an outermost surface 102a of the composite material 102 supported on the tooling assembly 500.

In other embodiments of method 1700, deploying the feature forming tool 510 as shown at 1708 in FIG. 17 comprises inserting a pin 414 through the composite material 102 and into the tooling aperture 509 and placing a generally disk-shaped tool 510 over the pin 414, as described with respect to FIG. 16B. More particularly, after the pin 414 is inserted into the aperture 128, the disk-shaped feature forming tool 510 is positioned over the pin 414, and the disk 510 guides and presses the composite material 102 into the recess 516 of the segmented tool 504 as the disk 510 is seated into the recess. The disk-shaped feature forming tool 510 may be seated within the recess 516 when an edge of the disk 510 is in contact with the outermost surface 102a of the composite material 102 supported on the tooling assembly 500.

After the feature forming tool 510 is deployed to press the composite material 102 into the one or more recesses 516, as shown at 1710 in FIG. 17, the method 1700 may include sealing a bag 125 around the composite material 102 with the feature forming tool 510 in contact with the material, as illustrated in FIGS. 16A and 16B. That is, the composite material 102 may be bagged for processing with the feature forming tool 510 in contact with the material 102. For example, bagging the composite material 102 includes enclosing or encasing the material 102 and feature forming tool 510 within a vacuum bag, such as a flexible bladder or the like formed from any suitable material. A vacuum may be drawn within the vacuum bag through a vacuum port connected to a vacuum pump, e.g., to remove air and volatiles from the composite material 102. In some embodiments, the bag may be omitted, such that method 1700 does not include sealing the bag 125 around the composite material 102 on the tooling assembly 500 with the feature forming tool 510 in contact with the composite material.

Then, as depicted at 1712 in FIG. 17, the composite material 102 is processed, e.g., compacted and autoclaved or, more generally, debulked and/or processed to reduce porosity, with the feature forming tool 510 pressing the composite material 102 into the one or more recesses 516 of the segmented tool 504. The processed composite material forms a green state composite component having the features formed by the interaction between the feature forming tool 510 and the recess(es) 516 of the segmented tool 504. In embodiments of method 1700 that include inserting a pin 414 as part of deploying the feature forming tool 510, the pin 414 is fixed or embedded in the green state composite component such that the green state composite component includes the pin 414.

As shown at 1714 and 1716 in FIG. 17, after processing, the bag 125 (if used) and the feature forming tool 510 are removed from the green state composite component, and then the green state composite component undergoes finish processing to produce the composite component 90 having one or more features, such as a countersink feature 106 and/or a counterbore feature 108. As described above with respect to method 700 illustrated in FIG. 7, finish processing of the green state composite component may include one or more processes that may differ depending on the type of composite material 102 used in the method 1700. In one embodiment, where the composite material 102 is a CMC material, finish processing at 1716 in FIG. 17 includes firing (or burn-off) of the green state composite component to produce a fired composite component, followed by densification of the fired composite component to produce the composite component. The firing and densification processes may be similar to those described above with respect to method 700. Further, as shown at 1718 in FIG. 17, after finish processing the composite component optionally may be finish machined, if and as needed, and/or coated with one or more coatings, such as an environmental barrier coating (EBC) or a thermal barrier coating (TBC).

Turning now to FIGS. 18 and 19, other assemblies and methods for forming features in composite components will be described in greater detail. The foregoing embodiments generally describe a first tool defining one or more recesses on which a composite material is deposited, and a second tool that is brought into contact with the composite material (directly or indirectly, such as through a vacuum bag) to press the composite material into the one or more recesses defined by the first tool. The second tool generally has one or more inserts or a head shaped complementary to the one or more recesses of the first tool such that the interaction between the inserts or head, the composite material, and the one or more recesses urges the composite material to conform to the shape of the one or more recesses. However, it will be appreciated that, in other embodiments, an inverse or opposite configuration of the tools could be used. That is, the second tool, which is brought into contact with a composite material deposited on the first tool, may define the one or more recesses while the first tool defines one or more raised features complementary to the shape of the one or more recesses of the second tool. As such, the interaction between the raised features, the composite material, and the one or more recesses urges the composite material to conform to the shape of the one or more recesses. Accordingly, each of the foregoing embodiments, as well as the embodiments of FIGS. 18 and 19, illustrate a first tool and a second tool, the first tool having one or more elements, such as recesses or raised features, that interact with one or more elements of the second tool, such as recesses, inserts, or forming heads, to form one or more features of a composite component.

FIG. 18 illustrates one example of such an inverse or opposite configuration. Similar to the embodiment depicted in FIGS. 8A and 8B, the exemplary embodiment of FIG. 18 illustrates a base tool 200 comprising a proximal surface 200a opposite a distal surface 200b, as well as one or more raised features 203 extending from the proximal surface 200a. A plurality of composite plies 102 may be laid up on the proximal surface 200a of the base tool 200. A feature forming tool 210, comprising a shank 216 and a feature forming head 218, may be brought into contact with the plurality of composite plies 102 to help define one or more features of a composite component 90 formed from the plies 102, such as a countersink feature 106 (FIG. 2), a counterbore feature 108 (FIG. 2), a locating feature, or additional and/or different features. More particularly, the feature forming head 218 of the tool 210 defines a recess 204 shaped complementary to the one or more features 203 of the base tool 200. As shown in FIG. 18, the feature forming head 218 may be brought into contact with the composite plies 102 on base tool 200 to press the plies 102 into the recess 204 such that, together, the recess 204 and the raised feature 203 help define the one or more features of the composite component 90. It will be appreciated that the base tool 200 and feature forming tool 210 may have other features as described in greater detail with respect to FIGS. 8A and 8B; for example, the feature forming tool 210 may comprise a plurality of forming members 214 supported by a frame 212, and the base tool 200 may define one or more alignment features 201 for aligning the feature forming tool 210 with the base tool 200. Further, a method such as or substantially similar to the exemplary method 900 described with respect to FIG. 9 may be used to form a composite component having one or more formed in features, i.e., features defined in the component without machining the features in the component after processing the composite material 102, using the base tool 200 and feature forming tool 210 illustrated in FIG. 18. However, other suitable methods or processes also may be used.

FIG. 19 depicts another example of an inverse or opposite configuration, illustrating an embodiment that generally is the inverse or opposite of the embodiment illustrated in FIGS. 10A through 11F. More particularly, FIG. 19 illustrates a base tool 300 comprising a proximal surface 300a opposite a distal surface 300b, as well as one or more raised features 303 extending from the proximal surface 300a. A plurality of composite plies 102 may be laid up on the proximal surface 300a of the base tool 300. A feature forming tool 310, comprising a stem 312 and a feature forming head 314, may be brought into contact with the plurality of composite plies 102 to help define one or more features of a composite component 90 formed from the plies 102, such as a countersink feature 106 (FIG. 2), a counterbore feature 108 (FIG. 2), a locating feature, or additional and/or different features. More particularly, the feature forming head 314 of the tool 310 defines a recess 304 shaped complementary to the one or more features 303 of the base tool 300. As shown in FIG. 19, the feature forming head 314 may be brought into contact with the composite plies 102 on base tool 300 to press the plies 102 into the recess 304 such that, together, the recess 304 and the raised feature 303 help define the one or more features of the composite component 90. It will be appreciated that the base tool 300 and feature forming tool 310 may have other features as described in greater detail with respect to FIGS. 10A through 11F; for example, a tip end 312b of the stem 312 of the feature forming tool 310 may be inserted through the composite plies 102 to form an aperture therein, or the tip end 312b may be drawn through an aperture formed in the plies 102 and into an aperture in the base tool to bring the feature forming tool 310 into contact with the plies 102. Further, a method such as or substantially similar to the exemplary method 1200 described with respect to FIG. 12 may be used to form a composite component having one or more formed in features, i.e., features defined in the component without machining the features in the component after processing the composite material 102, using the base tool 300 and feature forming tool 310 illustrated in FIG. 19. Other suitable methods or processes may be used as well.

In addition, although described only with respect to base tool 200 and feature forming tool 210, as well as base tool 300 and feature forming tool 310, it will be understood that, where appropriate, a generally inverse or opposite configuration of any of the embodiments described herein may be utilized to form a composite component having one or more formed in features. Moreover, it will be appreciated that the assemblies and structures for forming one or more features of a composite component described herein also are by way of example only. Additionally, the foregoing methods 700, 900, 1200, 1500, and 1700 for forming one or more features of a composite component, e.g., a CMC or PMC component such as a gas turbine engine exhaust liner, are provided by way of example only. For example, other known methods or techniques for depositing composite material on a tool or tooling assembly, compacting and/or curing the composite material, and/or finish processing a green state component, may be utilized. Alternatively, any combinations of these or other known methods or techniques may be used to form a composite component having one or more features defined therein.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for forming features in a composite component, comprising:
    depositing a composite material on a base tool;
    aligning an aperture forming tool with a tooling aperture in the base tool;
    inserting the aperture forming tool through the composite material to form an aperture in the composite material;
    removing the aperture forming tool from the composite material;
    deploying a feature forming tool to press the composite material into one or more recesses, the feature forming tool comprising a feature forming head; and
    processing the composite material with the feature forming tool in contact with the composite material, the processed composite material forming a green state composite component,
    wherein the feature forming head is configured to form a feature of the composite component.

2. The method of claim 1, further comprising, after inserting the aperture forming tool and prior to removing the aperture forming tool from the composite material:
    removing a sharp end from the aperture forming tool, a shaft of the aperture forming tool remaining in contact with the composite material; and
    attaching the feature forming tool to the shaft of the aperture forming tool.

3. The method of claim 1, wherein the base tool defines the one or more recesses and comprises a proximate surface that contacts the composite material laid up on the base tool, wherein the base tool further comprises a distal surface opposite the proximate surface, wherein the tooling aperture extends from a distal end at the distal surface to a proximate end at one of the one or recesses, and wherein the aperture forming tool is inserted into the tooling aperture through the distal end.

4. A method for forming features in a composite component, comprising:
    depositing a composite material on a base tool;
    forming an aperture through the composite material;
    bringing a feature forming head of a feature forming tool into contact with the composite material; and
    processing the composite material with the feature forming head in contact with the composite material, the processed composite material forming a green state composite component,
    wherein the feature forming tool comprises a stem extending through the composite material and into the base tool,
    wherein the feature forming head comprises an edge formed from a first material,
    wherein the remainder of the feature forming tool is formed from a second material, the second material being harder than the first material, and
    wherein the feature forming head is configured to form a feature of the composite component.

5. The method of claim 4, further comprising, after bringing the feature forming head into contact with the composite material and before processing the composite material:
    sealing a bag around the feature forming tool and the composite material.

6. The method of claim 4, further comprising, after processing the composite material with the feature forming head in contact with the composite material:
    removing the feature forming tool from the green state composite component; and
    finish processing the green state composite component to produce the composite component.

7. The method of claim 4, further comprising, prior to bringing the feature forming head into contact with the composite material:
    inserting the feature forming tool through the aperture.

8. The method of claim 4, wherein forming the aperture through the composite material comprises using a guide tool to push a stem attached to a stop away from the composite material, the stop positioned against an outermost surface of the composite material, and to push a sharp end of an aperture forming tool through a tooling aperture in the base tool and into the stop.

9. The method of claim 4, further comprising, prior to depositing the composite material on the base tool:
    assembling a tooling assembly with the base tool,
    wherein a portion of the tooling assembly is positioned in a passage defined in the base tool.

10. The method of claim 4, wherein a seal is positioned between the stem of the feature forming tool and the base tool.

11. The method of claim 4, wherein forming the aperture through the composite material comprises piercing the composite material with an aperture forming tool, and wherein bringing the feature forming tool into contact with the composite material comprises attaching the feature forming tool to the aperture forming tool and drawing the aperture forming tool back through the composite material until the feature forming head of the feature forming tool is in contact with an outermost surface of the composite material.

12. A method for forming features in a composite component, comprising:
    depositing a composite material on a tooling assembly, the tooling assembly comprising a shoulder bushing, the shoulder bushing positioned in a base tool and defining an opening therethrough, the shoulder bushing have a first end opposite a second end, the first end adjacent the composite material deposited on the tooling assembly, the second end extending through the base tool;

securing an end cap on the second end of the shoulder bushing;

forming an aperture through the composite material;

inserting a pin into the aperture such that the pin extends through the composite material and into the tooling assembly, the pin inserted into the opening in the shoulder bushing; and processing the composite material with the pin extending through the composite material, the processed composite material forming a green state composite component, wherein the pin is fixed in the green state composite component such that the green state composite component includes the pin.

13. The method of claim 12, further comprising, after inserting the pin and before processing the composite material:

sealing a bag around the composite material and the pin.

14. The method of claim 12, wherein the tooling assembly comprises a main tool and a segmented tool, the segmented tool comprising two or more segments that fit within the main tool, the segmented tool defining one or more recesses for forming features in composite components.

15. The method of claim 12, further comprising, after inserting the pin but before processing the composite material, placing a feature forming tool over the pin and against an outermost surface of the composite material, wherein the feature forming tool is a thin disk.

16. The method of claim 12, wherein the composite material is a ceramic matrix composite material, and wherein the pin is a ceramic pin.

17. The method of claim 12, wherein the composite material is a polymer matrix composite material, and wherein the pin is a metal pin.

* * * * *